US010587346B2

(12) United States Patent
Fujita

(10) Patent No.: US 10,587,346 B2
(45) Date of Patent: Mar. 10, 2020

(54) OPTICAL TRANSMITTER AND METHOD OF CONTROLLING THE SAME

(71) Applicant: NEC CORPORATION, Tokyo (JP)

(72) Inventor: Sadao Fujita, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 16/070,151

(22) PCT Filed: Jan. 18, 2017

(86) PCT No.: PCT/JP2017/001534
§ 371 (c)(1),
(2) Date: Jul. 13, 2018

(87) PCT Pub. No.: WO2017/126546
PCT Pub. Date: Jul. 27, 2017

(65) Prior Publication Data
US 2019/0036611 A1 Jan. 31, 2019

(30) Foreign Application Priority Data
Jan. 21, 2016 (JP) ................................ 2016-009407

(51) Int. Cl.
H04B 10/04 (2006.01)
H04B 10/564 (2013.01)
(Continued)

(52) U.S. Cl.
CPC ......... H04B 10/564 (2013.01); G02F 1/0123 (2013.01); H04B 10/50575 (2013.01); H04B 10/516 (2013.01); H04B 10/503 (2013.01)

(58) Field of Classification Search
CPC ............ H04B 10/564; H04B 10/50575; H04B 10/516; H04B 10/503; H04B 10/505;
(Continued)

(56) References Cited

U.S. PATENT DOCUMENTS 7,155,122 B2 * 12/2006 Wan ...................... H04B 10/504
398/32
7,158,723 B2 * 1/2007 Wan ...................... H04B 10/505
398/183
(Continued)

FOREIGN PATENT DOCUMENTS

JP 2012-247712 A 12/2012
JP 2013-110620 A 6/2013
(Continued)

OTHER PUBLICATIONS

Written Opinion for PCT/JP2017/001534, dated Apr. 25, 2017.
International Search Report for PCT/JP2017/001534, dated Apr. 25, 2017.

Primary Examiner — Hibret A Woldekidan
(74) Attorney, Agent, or Firm — Sughrue Mion, PLLC

(57) ABSTRACT

An optical transmitter includes optical modulation means for modulating a laser beam with a driving signal and outputting an optical signal; monitor means for detecting a part of the optical signal and outputting a monitor signal; bias voltage applying means for applying, to the optical modulation means, a bias voltage on which a dither signal is superimposed; average optical intensity detection means for detecting an average optical intensity of the optical signal from the monitor signal; top dither signal detection means for detecting, from the monitor signal, a top dither signal that is superimposed on a waveform with maximum optical intensity included in the optical signal; and bias voltage control means for controlling the bias voltage based on the average optical intensity and the top dither signal.

20 Claims, 20 Drawing Sheets

(51) Int. Cl.
*H04B 10/50* (2013.01)
*G02F 1/01* (2006.01)
*H04B 10/516* (2013.01)

(58) Field of Classification Search
CPC .......... H04B 10/50572; H04B 10/5051; H04B 10/50577; H04B 10/50597; H04B 10/5167; H04B 10/58; G02F 1/0123
USPC ........ 398/183, 186, 192, 195, 197, 198, 185
See application file for complete search history.

(56) References Cited

U.S. PATENT DOCUMENTS

| | | | | |
|---|---|---|---|---|
| 7,418,211 | B2* | 8/2008 | Akiyama | G02F 1/0121 398/185 |
| 7,551,858 | B2* | 6/2009 | Wan | H04B 10/505 398/183 |
| 7,734,192 | B2* | 6/2010 | Akiyama | G02F 1/0121 398/198 |
| 7,869,709 | B2* | 1/2011 | Wan | H04B 10/504 398/183 |
| 9,686,017 | B2* | 6/2017 | Yamanaka | H04B 10/564 |
| 10,191,307 | B2* | 1/2019 | Fujita | H04B 10/516 |
| 2006/0291870 | A1* | 12/2006 | Wan | H04B 10/505 398/183 |
| 2008/0219677 | A1* | 9/2008 | Asano | H04B 10/505 398/185 |
| 2009/0034988 | A1* | 2/2009 | Akiyama | G02F 1/0121 398/198 |
| 2009/0060528 | A1* | 3/2009 | Takashima | H04B 10/505 398/186 |
| 2015/0171971 | A1* | 6/2015 | Enoki | H04B 10/50575 398/183 |
| 2015/0188639 | A1* | 7/2015 | Akashi | H04B 10/50575 398/197 |
| 2015/0236790 | A1 | 8/2015 | Guo et al. | |

FOREIGN PATENT DOCUMENTS

| | | |
|---|---|---|
| JP | 5405716 B2 | 2/2014 |
| JP | 2014-516480 A | 7/2014 |
| JP | 2015-125282 A | 7/2015 |
| WO | 2013/027734 A1 | 2/2013 |

* cited by examiner

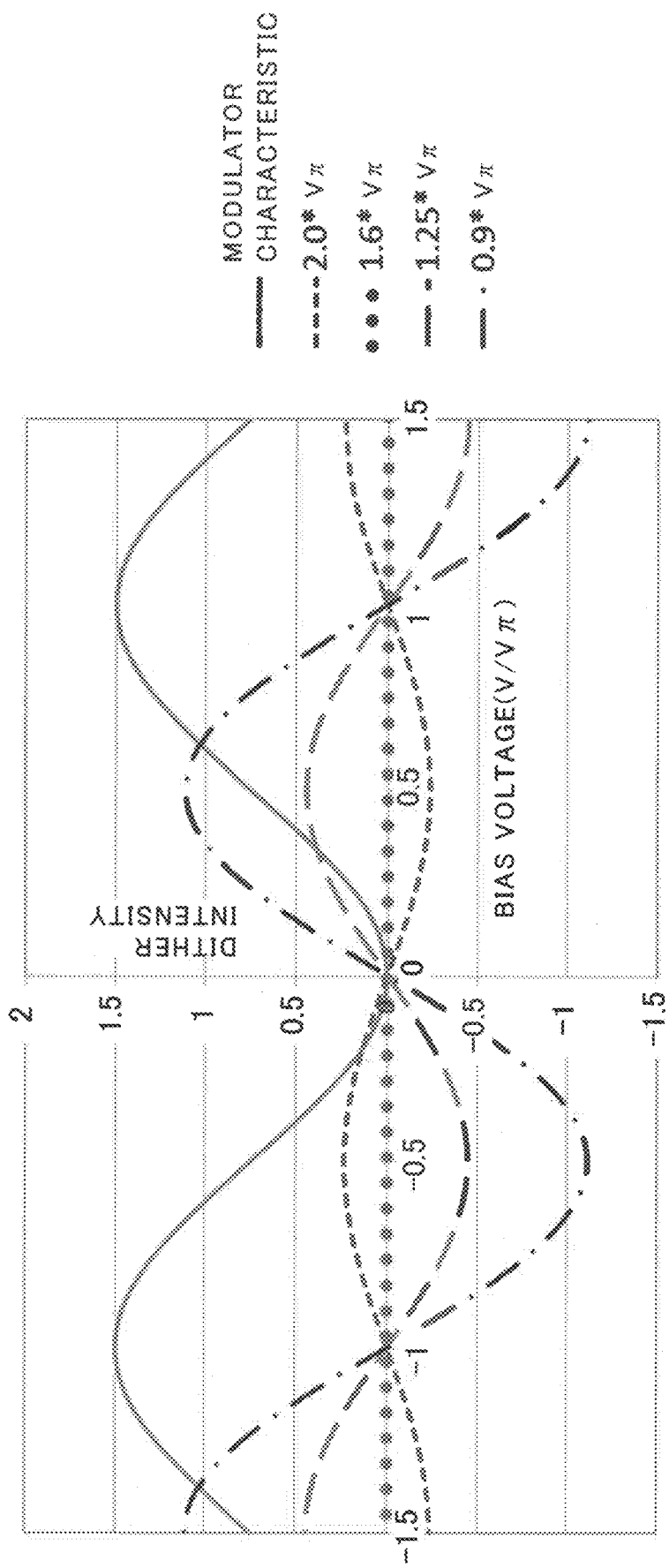

OPTICAL MODULATOR RESPONSE CHARACTERISTIC

← L1, L4

← L2, L3

TIME

← I(L1, L4)
Q(L1, L4)

TIME

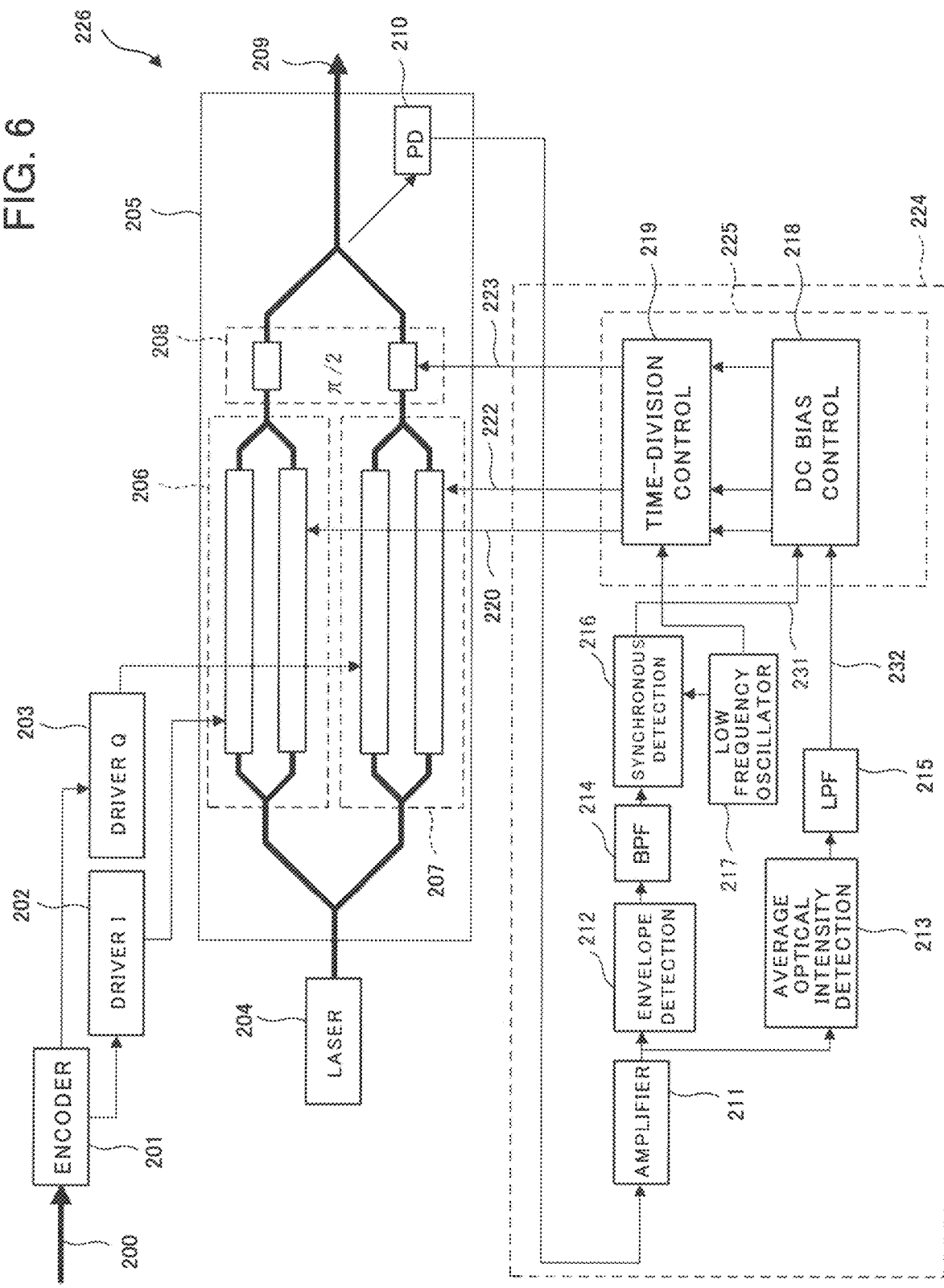

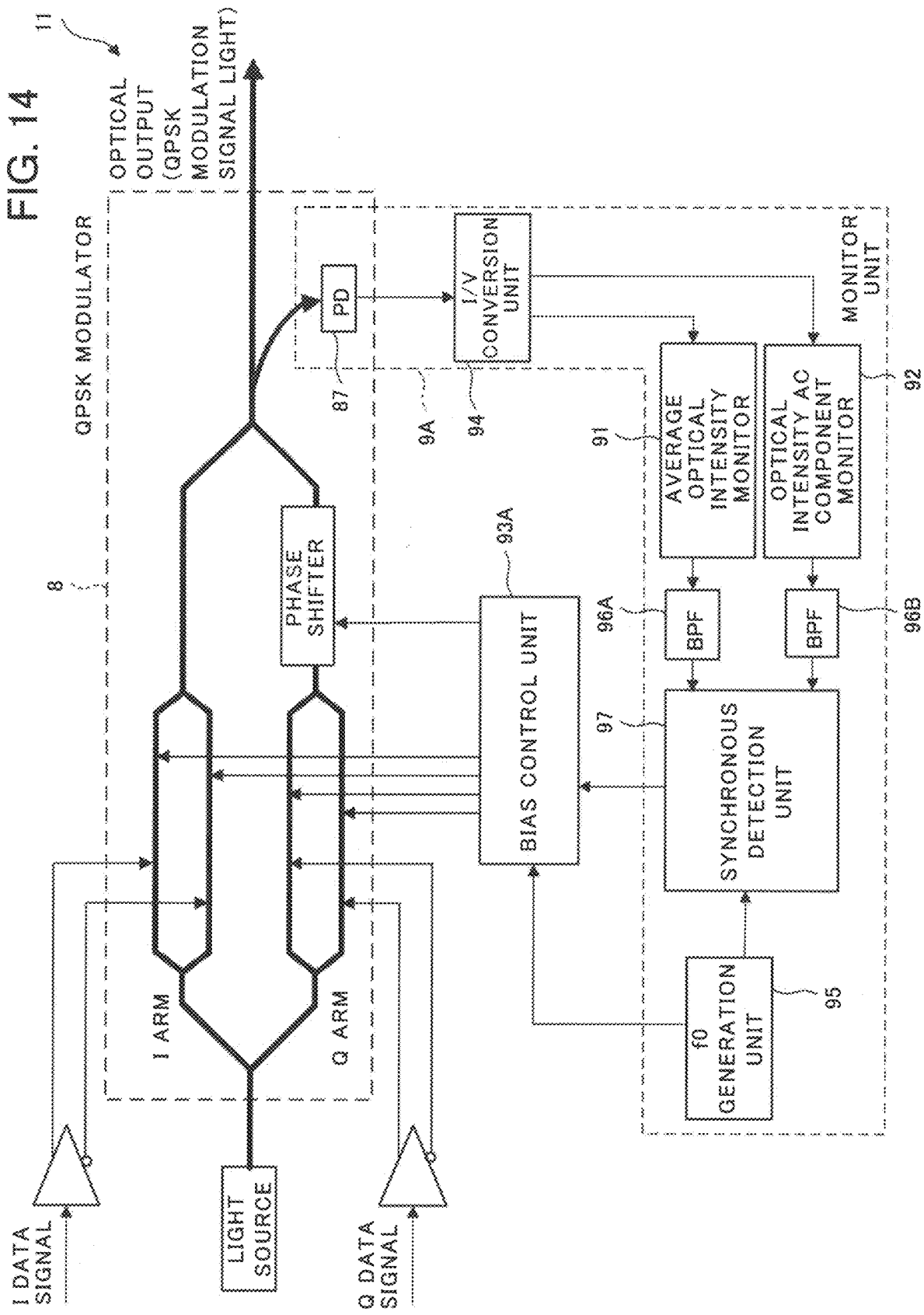

OPTICAL TRANSMITTER AND METHOD OF CONTROLLING THE SAME

CROSS REFERENCE TO RELATED APPLICATIONS

This Application is a National Stage of International Application No. PCT/JP2017/001534 filed Jan. 18, 2017, claiming priority based on Japanese Patent Application No. 2016-009407 filed Jan. 21, 2016.

TECHNICAL FIELD

The present invention relates to optical transmitters and methods of controlling optical transmitters and, in particular, to an optical transmitter employing a multilevel modulation system and a method of controlling the optical transmitter.

BACKGROUND ART

One of the methods for optimizing the investment in optical fiber communications, which corresponds to an increasing demand for information transmission by optical fiber communications, is to increase the spectral efficiency by adopting a modulation system more efficient for information to be transmitted. In order to increase the spectral efficiency, modulation systems based on quadrature phase shift keying (QPSK) have been developed in higher-capacity optical communication systems. In the QPSK system, information is encoded into four kinds of phase levels. Thus two-bit binary signals can be encoded per one symbol to be transmitted. Whereas the conventional on-off keying (OOK) has achieved information transmission with one bit per one sample, the QPSK modulation technology enables double amount of information to be transmitted with the same necessary bandwidth of optical spectrum.

Quadrature amplitude modulation (QAM) technology is one of the technologies that makes it possible to increase the communication capacity further by improving the spectral efficiency of one channel. In the QAM system, a symbol is encoded into a phase level and an amplitude level and configured as a combination of multilevel modulations in quadrature phases. In the 16QAM system, information is converted into 16 levels, that is, four-bit binary codes per symbol, for example. This makes it possible to increase the optical spectral efficiency twice compared to the QPSK system. The QAM system is an effective method for increasing the communication line capacity.

The QAM system can be implemented by using an optical IQ modulator. In the IQ modulator, two independent Mach-Zehnder devices are driven by electric signals. These are called child Mach-Zehnder modulators (MZMs). The child MZMs modulate the phase and intensity of the same optical carrier. The optical phase of one output of the two child MZMs is relatively delayed by 90 degrees before recoupling. The phase delay between the outputs of the child MZMs, which is called a quadrature phase angle, is ideally 90 degrees in a 180-degree method. The IQ modulator is used in the QAM modulation system and QPSK modulation system. The IQ modulator provides an efficient and demonstrated method to implement the QAM modulation.

It has been known, however, that in the IQ modulator, there is a drift of a direct current (DC) bias due to a temperature change or aged deterioration of a device. Three kinds of biases are affected by the drift. Specifically, these biases are DC biases for the two child MZMs, and a DC bias used for setting the angle between the output optical signals of the child MZMs at the quadrature phase angle. This has been already known with respect to the QPSK system, and it has been known that there is a drift with respect to the QAM system if a modulator with the same structure is used. If the drift occurs in the DC bias, the modulator is made to operate inaccurately, which causes transmission signal degradation. As a result, the signal quality in a receiving part deteriorates, or in worst case, it becomes impossible to decode received signals. With respect to the OOK, phase shift keying (PSK) modulation, and QPSK, the bias of the modulator is controlled by using an automatic bias control (ABC) circuit that compensates for a variation in the DC bias. This enables the above-described problem to be solved.

An example of a method of controlling such an optical modulator by the QPSK modulation system is described in Patent Literature 1. In the QPSK modulation system, the phase modulation of an I-arm and a Q-arm of the optical modulator is performed with an electric signal having an amplitude of $2 \times V\pi$ that is configured by using a peak, a valley, and a peak in optical intensity characteristics depending on driving voltages of the optical modulator. Here, $V\pi$ represents a voltage by which the phase of the optical modulator varies by $\pi$, and is also called a half-wavelength voltage. Patent literature 1 discloses a method of controlling a bias voltage of an optical modulator by superimposing a low-frequency signal with a frequency f0 (hereinafter also referred to as a dither signal) on the amplitude of a driving signal.

On the other hand, in recent years, Nyquist modulation has been performed in the QPSK system in optical communications. The Nyquist modulation is to perform optical modulation after limiting band of an electric driving waveform of an optical modulator through a low-pass filter that makes only a Nyquist frequency pass. The Nyquist frequency is a frequency with half the baud-rate of a modulation signal. In a low-pass filter used practically, its roll-off coefficient $\alpha$ is set at approximately 0.1. Because of the band limitation, the optically modulated optical spectrum can be narrowed to half, compared to the optical spectrum before applying the low-pass filter. As a result, the wavelength interval can be decreased in wavelength division multiplexing (WDM) transmission; accordingly, it becomes possible to extend the capacity of a WDM transmission device. Although the Nyquist modulation has advantages in the WDM transmission as described above, the driving signals are not conventional two kinds of binary digital signals but electric signals obtained by the synthesis of analog waveforms. Such analog electric signals are included in signals based on a 16QAM system or an orthogonal frequency division multiplexing (OFDM) system. If the driving signal is such an analog signal, it is impossible to perform the bias control of the optical modulator by means of the method described in Patent Literature 1.

Patent Literature 2 discloses an example of an optical transmitter in which the bias control of an optical modulator can be performed even though the above-described analog driving signal is used. The optical transmitter described in Patent Literature 2 is configured to select a polarity for an error signal properly depending on an average modulation degree of an analog driving signal by including an error-signal polarity selection unit. Specifically, if the average modulation degree is greater than 50%, the error-signal polarity selection unit selects non-inversion of polarity. In contrast, if the average modulation degree is less than 50%, the error-signal polarity selection unit selects inversion of polarity. A bias control unit controls the bias voltage of the optical modulator based on an error signal with the polarity that the error-signal polarity selection unit has selected.

However, the optical transmitter described in Patent Literature 2 has the problem that the bias control cannot be performed if the average modulation degree is equal to 50%, because the average optical output level does not vary even if the bias voltage varies. Patent Literature 3 discloses a technique for solving this problem.

FIG. 14 illustrates a configuration of a related optical transmitter 11 for QPSK described in Patent Literature 3. The related optical transmitter 11 includes a QPSK modulator 8, a monitor unit 9A, and a bias control unit 93A. Here, the monitor unit 9A includes a photodiode (PD) 87, an average optical intensity monitor 91, an optical intensity AC component monitor 92, an I/V conversion unit 94, an f0 generation unit 95, band-pass filters (BPF) 96A and 96B, and a synchronous detection unit 97.

The photodiode (PD) 87 receives part of output light from the QPSK modulator 8. The I/V conversion unit 94 generates a monitor signal obtained by converting current output from the PD 87 into voltage. The monitor signal is inputted into the average optical intensity monitor 91 and the optical intensity AC component monitor 92, respectively. The average optical intensity monitor 91 detects an average value of the monitor signal. The optical intensity AC component monitor 92 detects an AC component included in the monitor signal. Here, an RMS (root mean square value: AC effective value)-DC converter can be used as the optical intensity AC component monitor 92.

The synchronous detection unit 97 synchronously detects a low-frequency signal inputted from the f0 generation unit 95 and f0 components inputted from the BPF 96A and BPF 96B. The bias control unit 93A is configured to perform the bias control of the QPSK modulator 8 selectively using one of the f0 components indicative of the detection results of the monitors 91 and 92 that have been extracted by the synchronous detection in the synchronous detection unit 97.

That is to say, if a driving amplitude Vd is in a state of crossing Vπ, the bias control unit 93A performs the bias control using the result obtained by synchronously detecting the detection results of the optical intensity AC component monitor 92 in the synchronous detection unit 97. Specifically, the bias control unit 93A controls a bias voltage so that the optical intensity AC component will be at a minimum, for example. In contrast, in cases other than the above, the bias control unit 93A performs the bias control by using the result obtained by synchronously detecting the detection result of the average optical intensity monitor 91 in the synchronous detection unit 97.

As described above, the related optical transmitter 11 is configured to use the average optical intensity monitor 91 and optical intensity AC component monitor 92 in a mutually complementary manner; consequently, it becomes possible to perform the bias control without depending on the driving amplitude.

CITATION LIST

Patent Literature

[PTL 1] Japanese Patent No. 5405716
[PTL 2] Japanese Unexamined Patent Application Publication No. 2013-110620
[PTL 3] Japanese Unexamined Patent Application Publication No. 2015-125282

SUMMARY OF INVENTION

Technical Problem

As mentioned above, in the related optical transmitter 11 for QPSK described in Patent Literature 3, if the driving amplitude is equal to Vπ, there appears an AC component corresponding to the variation in the output optical intensity in the signal obtained by converting output light of the QPSK modulator 8 into an electric signal. The optical transmitter 11 is configured to perform the bias control by detecting the AC component using the optical intensity AC component monitor 92.

However, the configuration deals with a modulation system such as QPSK in which binary digital modulation is performed, and cannot deal with a modulation system using analog signals such as 16QAM that enables a large-capacity transmission. The reason is as follows.

In the case of 16QAM, the driving waveform applied to the optical modulator is a pulse-amplitude modulation (PAM4) signal having four kinds of levels, and a waveform in which binary levels are added to the central portion of the conventional binary digital signals. If the bias of the optical modulator, which is driven by the PAM4 driving waveform, shifts, the detected optical intensity AC component does not correspond to the shift amount of the bias; consequently, the minimum point of the signal does not become the optimum bias point of the optical modulator. As a result, it is impossible in the 16QAM modulation to perform the bias control with the increased driving signal amplitude by which the driving amplitude Vd can cross Vπ.

As described above, there has been the problem that it is difficult to perform bias control without depending on a driving signal amplitude in optical modulations employing an analog signal such as a multilevel modulation signal.

The objective of the present invention is to provide an optical transmitter and a method of controlling the optical transmitter that solve the above-mentioned problem that it is difficult to perform bias control without depending on a driving signal amplitude in optical modulations employing an analog signal such as a multilevel modulation signal.

Solution to Problem

An optical transmitter according to an exemplary aspect of the present invention includes optical modulation means for modulating a laser beam with a driving signal and outputting an optical signal; monitor means for detecting a part of the optical signal and outputting a monitor signal; bias voltage applying means for applying, to the optical modulation means, a bias voltage on which a dither signal is superimposed; average optical intensity detection means for detecting an average optical intensity of the optical signal from the monitor signal; top dither signal detection means for detecting, from the monitor signal, a top dither signal that is superimposed on a waveform with maximum optical intensity included in the optical signal; and bias voltage control means for controlling the bias voltage based on the average optical intensity and the top dither signal.

A method of controlling an optical transmitter according to an exemplary aspect of the present invention includes applying a bias voltage on which a dither signal is superimposed to optical modulation means constituting the optical transmitter and configured to modulate a laser beam with a driving signal and output an optical signal; detecting a part of the optical signal and generating a monitor signal; detecting an average optical intensity of the optical signal from the monitor signal; detecting an top dither signal from the monitor signal, the top dither signal being superimposed on a waveform with maximum optical intensity included in the optical signal; and controlling the bias voltage based on the average optical intensity and the top dither signal.

Advantageous Effects of Invention

According to the optical transmitter and the method of controlling the optical transmitter of the present invention, it becomes possible to perform bias control without depending on a driving signal amplitude even in optical modulations employing an analog signal such as a multilevel modulation signal.

BRIEF DESCRIPTION OF DRAWINGS

FIG. 2C is a diagram illustrating calculation results of a dither signal in 16QAM modulation system to explain the operation of the optical transmitter according to the first example embodiment of the present invention.

FIG. 6 is a block diagram illustrating a configuration of an optical transmitter according to a second example embodiment of the present invention.

FIG. 14 is a block diagram illustrating a configuration of a related optical transmitter.

EXAMPLE EMBODIMENT

Example embodiments of the present invention will be described below with reference to the drawings.

First Example Embodiment

Figure 1:
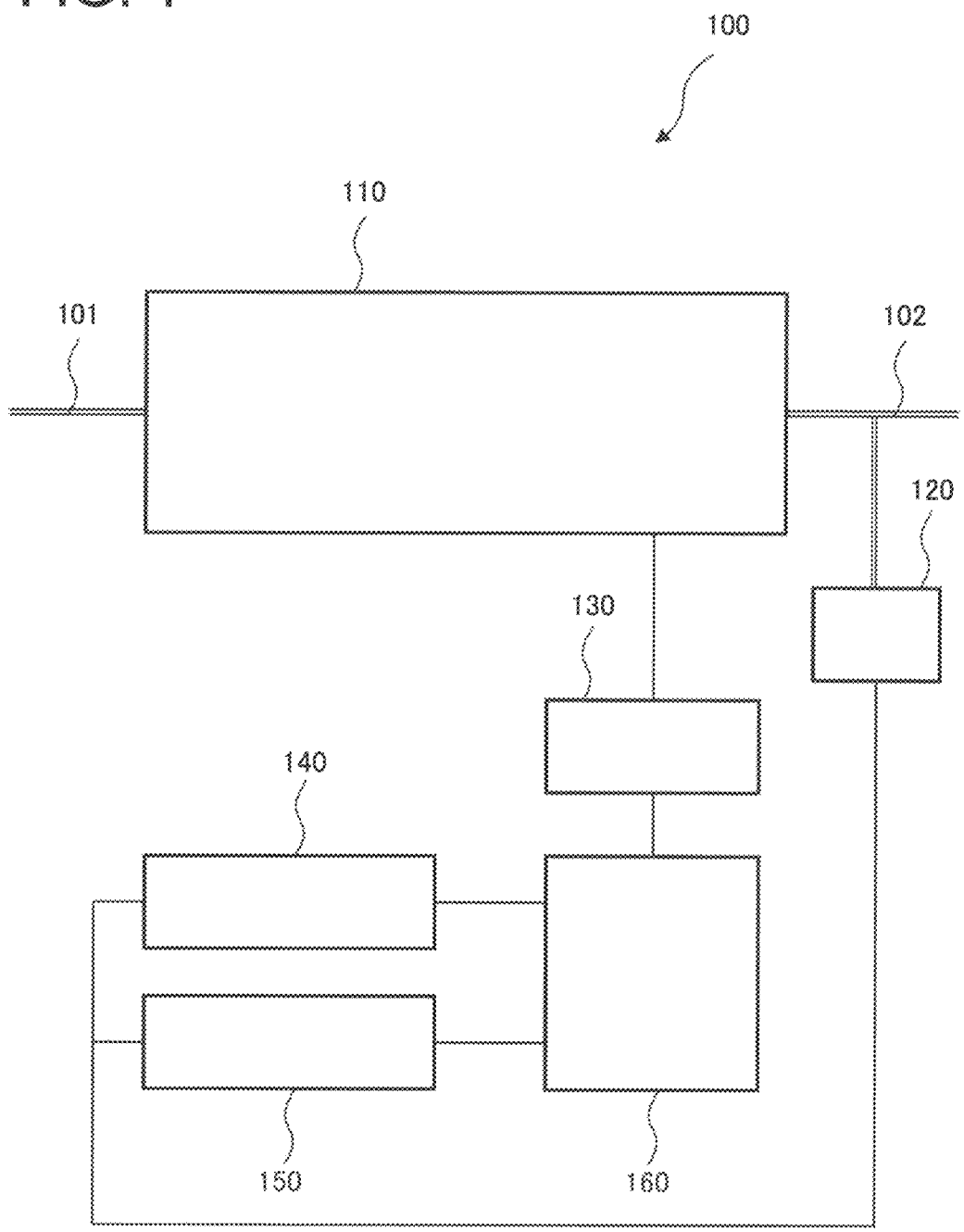
FIG. 1 is a block diagram illustrating a configuration of an optical transmitter according to a first example embodiment of the present invention.

FIG. 1 is a block diagram illustrating a configuration of an optical transmitter 100 according to a first example embodiment of the present invention. The optical transmitter 100 includes an optical modulation section 110, a monitor section 120, a bias-voltage applying section 130, an average optical intensity detection section 140, a top dither-signal detection section 150, and a bias-voltage control section 160.

The optical modulation section 110 modulates a laser beam 101 with a driving signal, and outputs an optical signal 102. The monitor section 120 detects a part of the optical signal 102, and outputs a monitor signal. The bias-voltage applying section 130 applies, to the optical modulation section 110, a bias voltage on which a dither signal is superimposed. The average optical intensity detection section 140 detects an average optical intensity of the optical signal 102 from the monitor signal. The top dither-signal detection section 150 detects, from the monitor signal, a top dither signal that is superimposed on a waveform with maximum optical intensity included in the optical signal 102. The bias-voltage control section 160 controls the bias voltage based on the average optical intensity and the top dither signal.

As described above, the optical transmitter 100 according to the present example embodiment includes the average optical intensity detection section 140 and the top dither-signal detection section 150, and the bias-voltage control section 160 is configured to control the bias voltage of the optical modulation section 110 based on the average optical intensity and the top dither signal. Consequently, according to the optical transmitter 100 of the present example embodiment, it becomes possible to perform bias control without depending on a driving signal amplitude even in optical modulations employing an analog signal such as a multilevel modulation signal.

An analog waveform signal can be used as the driving signal of the optical modulation section 110. For example, any one of an analog waveform signal by a multilevel modulation system including a quadrature amplitude modulation system and an analog waveform signal by a Nyquist modulation system can be used as the driving signal.

Next, the operation of the optical transmitter 100 according to the present example embodiment will be described in detail.

Figure 2A:
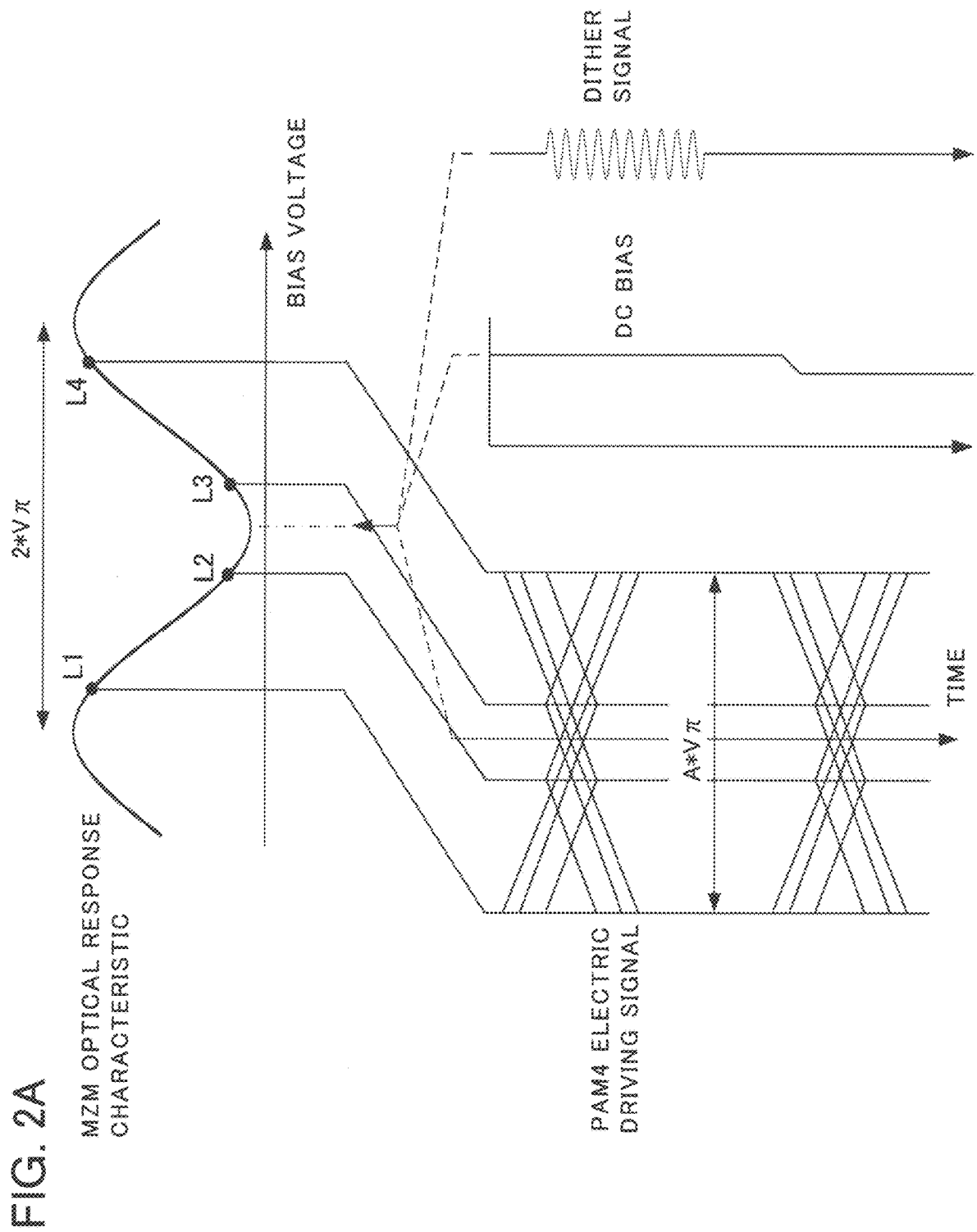
FIG. 2A is a diagram illustrating an optical response characteristic of a Mach-Zehnder modulator and a QAM modulation state to explain the operation of the optical transmitter according to the first example embodiment of the present invention.
Figure 2B:
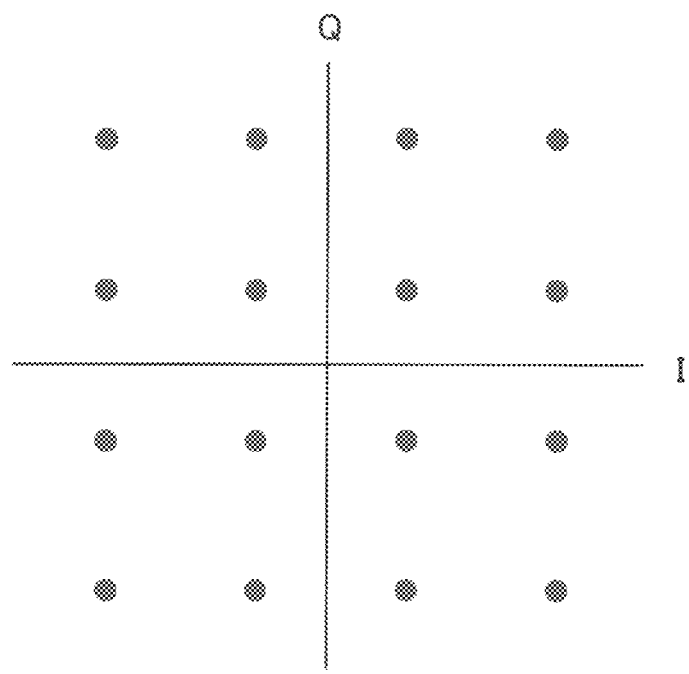
FIG. 2B is a diagram illustrating a constellation in 16QAM optical modulation by an optical modulator included in the optical transmitter according to the first example embodiment of the present invention.

First, an optical modulator and its modulation system will be described. FIG. 2A illustrates an optical response characteristic of a Mach-Zehnder modulator (MZM) and its state at QAM modulation. Here, a case where the optical modulation is performed in accordance with 16QAM system is shown as an example. FIG. 2B illustrates a constellation of optical modulator output in 16QAM optical modulation.

The optical modulation with 16QAM can be performed by applying PAM4 electric driving signals to each of a child MZM in I-arm and a child MZM in Q-arm. FIG. 2A also illustrates a relationship between the PAM4 electric driving signal, a DC bias for bias control of the MZM, and a dither signal to use the bias control. The DC bias is controlled and applied so that the center of the PAM4 electric driving signal may correspond to a null point of the optical response characteristic of the MZM. In FIG. 2A, signal level values of PAM4 are represented by respective points of L1, L2, L3, and L4 on the optical response characteristic of the MZM.

The dither signal is illustrated with respect to the case in which the dither signal is applied by time division control. FIG. 2A illustrates a dither signal that is composed of a combination of a sine wave and a DC voltage with zero volt. The cycle of the sine wave is sufficiently slower than the baud-rate of the driving signal. Specifically, approximately one kilohertz is selected as the cycle of the dither signal when the baud-rate is 32 GHz cycle, for example. During the time range when the sine wave disappears and the output becomes zero in the dither signal in FIG. 2A, the dither signal of the size wave is applied to another child MZM of the optical modulator. If the optical modulator includes two children MZMs for I-arm and Q-arm, and a phase shifter section for a parent MZM including these child MZMs, the sine wave signal is time-divided into thirds, which are applied to each child MZM and the phase shifter section.

The 16QAM optical modulation illustrated in FIG. 2A is so-called analog modulation. Thus, if the analog electric signal is converted into an optical signal, it is preferable to set the driving amplitude of the analog electric signal at one smaller than a maximum driving amplitude ($2 \times V\pi$) in the MZM optical response characteristic, taking into account the linearity of the analog electric signal and a control error of DC bias. This makes it possible to prevent a symbol distortion at points L1 and L4. On the other hand, in order to increase optical transmission power, it is preferable that the driving amplitude should be as large as possible. FIG. 2A illustrates an example of the setting of the driving amplitude which satisfies both of the characteristics. Here, a voltage different between point L4 and point L1 is set at $1.6 \times V\pi$. However, if the driving amplitude is $1.6 \times V\pi$, the problem is caused that the dither signal cannot be detected by the conventional method described in Patent Literature 1. The reason will be described below.

FIG. 2C illustrates calculation results of the dither signal in the 16QAM modulation system. The detection method of the dither signal is similar to that described in Patent Literature 1. That is to say, a part of an optical modulation signal from the optical modulator is monitored, and then photoelectric conversion is performed. Subsequently, noise is eliminated by means of a low-pass filter having a band that is approximately several times wider than that of the dither signal frequency, and the amplitude value of the dither signal at this time is defined as a dither intensity. As illustrated in FIG. 2C, the dither intensity in the 16QAM modulation system varies in the direction of disappearance as the driving amplitude decreases from $2.0 \times V\pi$ to $1.6 \times V\pi$. If the driving amplitude is made further smaller than $1.6 \times V\pi$, the phase of the dither signal is reversed, and the dither amplitude begins to increase. Such phenomenon is pointed out also in Patent Literature 2, as mentioned above.

The reason why the dither signal disappears with the driving amplitude set at $1.6 \times V\pi$ is that the respective dither signals on the driving signal at points L1, L2, L3, and L4 vary in the direction of cancelling each other out. Specifically, if the dither signal moves by only a small amount toward a positive voltage direction (the right direction in the figure) under the driving condition illustrated in FIG. 2A, each level of the optical signal varies in the direction of decrease at point L1, decrease at point L2, increase at point L3, and increase at point L4. Consequently, the entire variation of the detected dither signals becomes zero. Here, the reason why the dither signal becomes zero is that the entirety of the dither signals at respective points of L1, L2, L3, and L4 is observed. Therefore, even in this case, if only a dither signal component regarding point L4 can be extracted, the dither signal related to the bias state can be detected.

Next, a method of extracting the dither signal from the 16QAM optical modulation signal will be described.

Figure 3A:
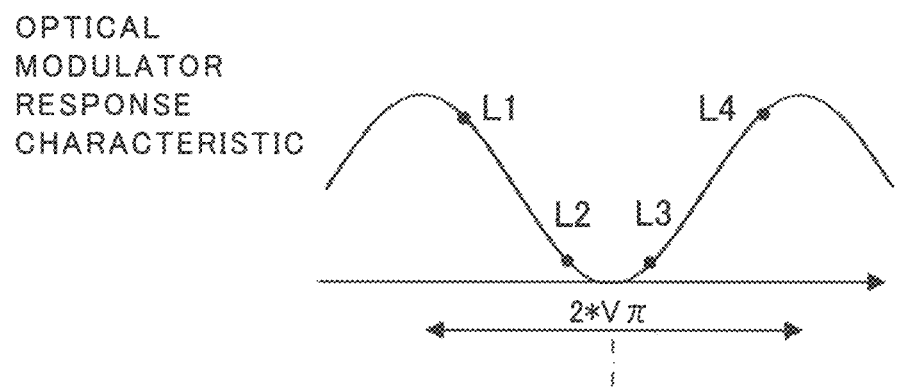
FIG. 3A is a diagram to explain the operation of the optical transmitter according to the first example embodiment of the present invention, and illustrating an optical response characteristic of a child MZM at 16QAM modulation and states of applied driving signal, with a bias of the optical modulator set properly.
Figure 3B:
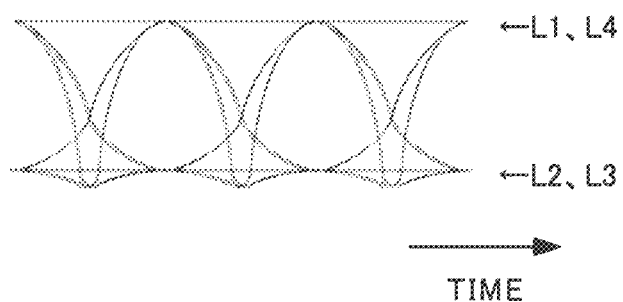
FIG. 3B is a diagram to explain the operation of the optical transmitter according to the first example embodiment of the present invention, and illustrating an optical intensity waveform modulated by the child MZM, with the bias of the optical modulator set properly.
Figure 3C:
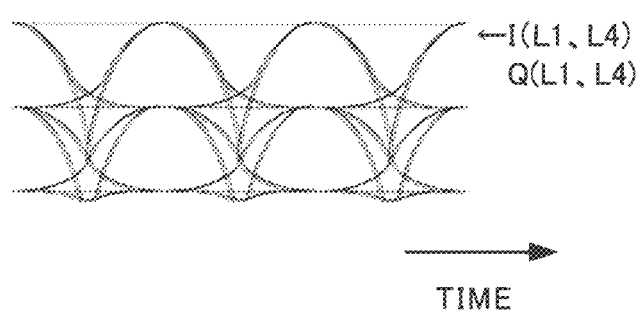
FIG. 3C is a diagram to explain the operation of the optical transmitter according to the first example embodiment of the present invention, and illustrating an optical intensity waveform with optical modulation waveforms of an I-arm and a Q-arm orthogonal mutually.

FIG. 3A is a diagram illustrating an optical response characteristic of a child MZM in an I-arm at 16QAM modulation and an application state of a driving signal (PAM4), with a bias of the optical modulator set properly. FIG. 3B illustrates an optical intensity waveform modulated by the child MZM in the I-arm with the PAM4 signal biased properly. Levels of L1 and L4 appear in the upper straight-line portion of the optical intensity waveform, and levels of L2 and L3 appear correspondingly at the lower straight-line level. FIG. 3C illustrates an intensity waveform obtained by observing, using a monitor photodiode (PD), an optical waveform with optical modulation waveforms of the I-arm and the Q-arm orthogonal mutually, that is, with a π/2 phase shift between the I-arm and the Q-arm. For the purpose of simple description, it is assumed that the monitor PD has no band limitation. The waveforms illustrated in FIG. 3C are intensity waveforms obtained by the optical modulator that performs 16QAM modulation and operates with a proper bias. In the top straight-line portion of the intensity waveforms, four constellation values, which are included in 16 constellation values corresponding to 16QAM, appear in an overlapping manner. The four constellation values are expressed in coordinates of I axis and Q axis, as follows: (L4, L4), (L1, L4), (L1, L1), and (L4, L1).

Figure 4A:
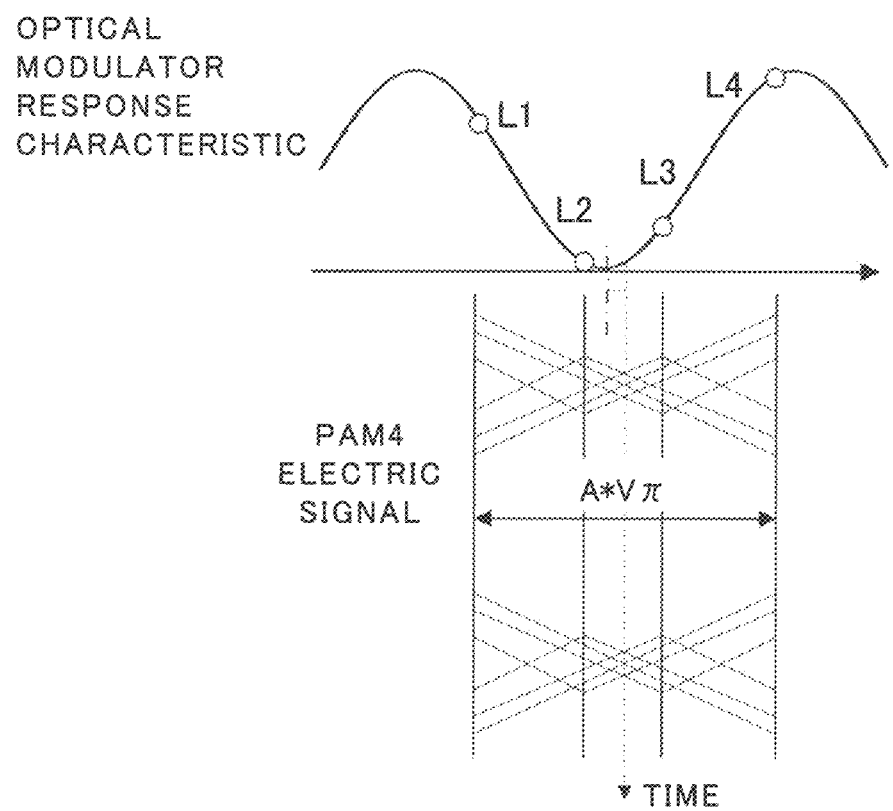
FIG. 4A is a diagram to explain the operation of the optical transmitter according to the first example embodiment of the present invention, and illustrating an optical response characteristic of the child MZM at 16QAM modulation and states of applied driving signal, with an error arising in the bias setting of the optical modulator.
Figure 4B:
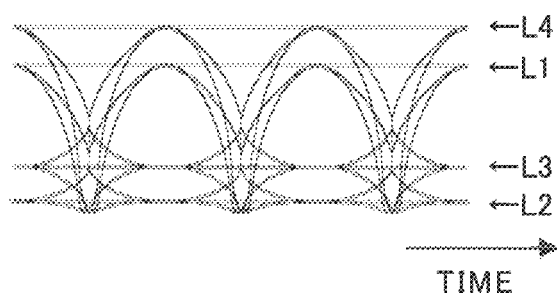
FIG. 4B is a diagram to explain the operation of the optical transmitter according to the first example embodiment of the present invention, and illustrating optical intensity waveforms modulated by the child MZM, with an error arising in the bias setting of the optical modulator.

FIG. 4A illustrates a driving state of the child MZM in the I-arm with an error arising in the bias setting. In this case, because the bias shifts to the right in the figure, the intensity of point L4 becomes maximum. FIG. 4B illustrates optical intensity waveforms by the child MZM in the I-arm with such a bias error arising. Four kinds of levels appear in linear arrangements in the optical intensity waveforms. The top straight line of them corresponds to L4, and the other straight lines correspond to L1, L3 and, L2, in order from the top.

Figure 4C:
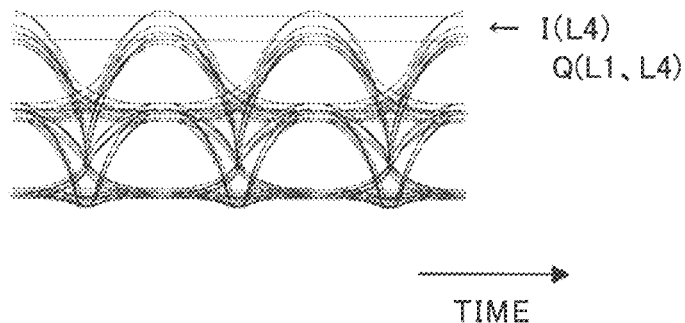
FIG. 4C is a diagram to explain the operation of the optical transmitter according to the first example embodiment of the present invention, and illustrating optical intensity waveforms with a bias setting error arising in the child MZM in the I-arm.

FIG. 4C illustrates optical intensity waveforms obtained by observing 16QAM modulation characteristics using an optical monitor, with a bias setting error arising in the child MZM in the I-arm. Although the optical modulation waveforms of the I-arm and the Q-arm have an orthogonal relationship, an error arises in the bias setting of the child MZM in the I-arm. As a result, a double line appears in the direction of intensity in the optical intensity waveforms from the optical monitor. In particular, the trace separates into two lines in the upper portion of the optical intensity waveforms, and in the top portion, only two constellation values of the 16 constellation values for 16QAM appear in an overlapping manner. The two constellation values are expressed in coordinates of I axis and Q axis, as follows: (L4, L4) and (L4, L1).

Figure 4D:
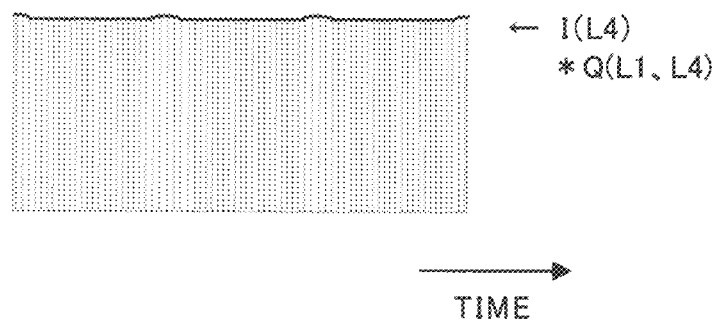
FIG. 4D is a diagram to explain the operation of the optical transmitter according to the first example embodiment of the present invention, and schematically illustrating a waveform obtained by envelope detecting the optical intensity waveform illustrated in FIG. 4C.

Here, the top portion of the optical intensity waveforms illustrated in FIG. 4C includes information on L4 related to the bias error in the I-arm. By AM (amplitude modulation) detecting (envelope detecting) the optical intensity waveforms, only the information on L4 of the child MZM in the I-arm can be extracted. FIG. 4D schematically illustrates a waveform obtained by envelope detecting the optical intensity waveforms. As is understood from the figure, the envelope detection makes it possible to extract only the waveform of the top portion of the optical intensity waveforms illustrated in FIG. 4C. If a dither signal is applied to only the modulator in the I-arm, the envelope-detected waveform in the top portion includes a dither signal related to the bias error in the I-arm modulator. In the conventional method described in Patent Literature 1, the power is detected by performing I-V conversion after receiving light by the optical monitor. That is to say, the method of observing the total of the respective levels (L1, L2, L3, L4) is used; therefore, it is impossible to extract only the dither signal regarding a particular level (L4 in the above example).

As mentioned above, the envelope detection makes it possible to extract the dither signal when a bias error occurs. For the envelope detection, it is possible to use an integrated circuit (IC) that is developed and marketed for mobile phones, for example. An envelope detector for mobile phones has a wide input band from DC to 6 GHz. It is possible to vary a detection band after envelope detection from 200 MHz to sub-MHz by changing an external capacitor. Because the input band of the envelope detector is as wide as 6 GHz, the above-mentioned operation can be performed by using the optical monitor waveform if a 12-bit-successive L4 signal arises periodically in the optical monitor signal of optical modulation with 16QAM-32Gbaud, for example. As a result, the dither signal related to L4 can be extracted from the envelope detection output. Specifically, for example, in the 16QAM-32Gbaud modulation using signals with PN series (pseudo-random pattern) 15 steps, the dither information can be extracted from the envelope detector even though the input band of the envelope detector is set at 1 GHz or less.

Figure 5A:
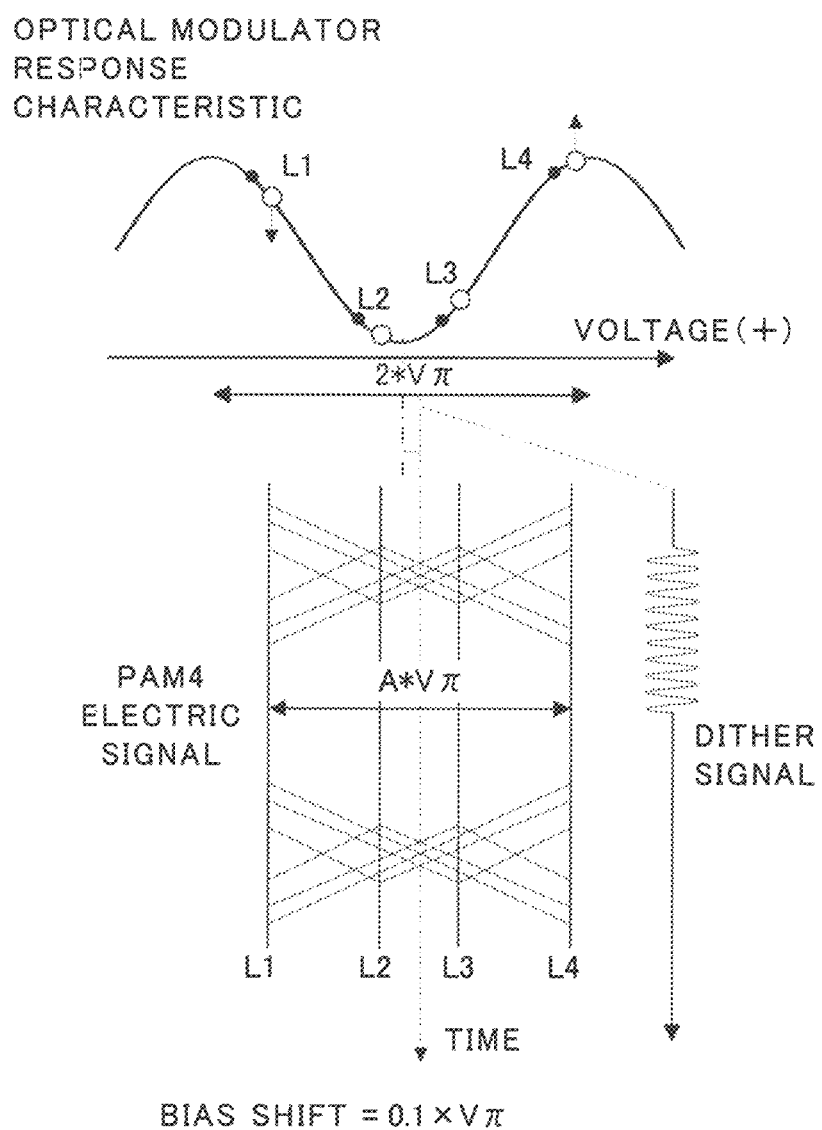
FIG. 5A is a diagram to explain the operation of the optical transmitter according to the first example embodiment of the present invention, and illustrating a driving signal at 16QAM modulation and level positions when a bias shift arises, with the bias shift equal to $0.1 \times V\pi$.
Figure 5B:
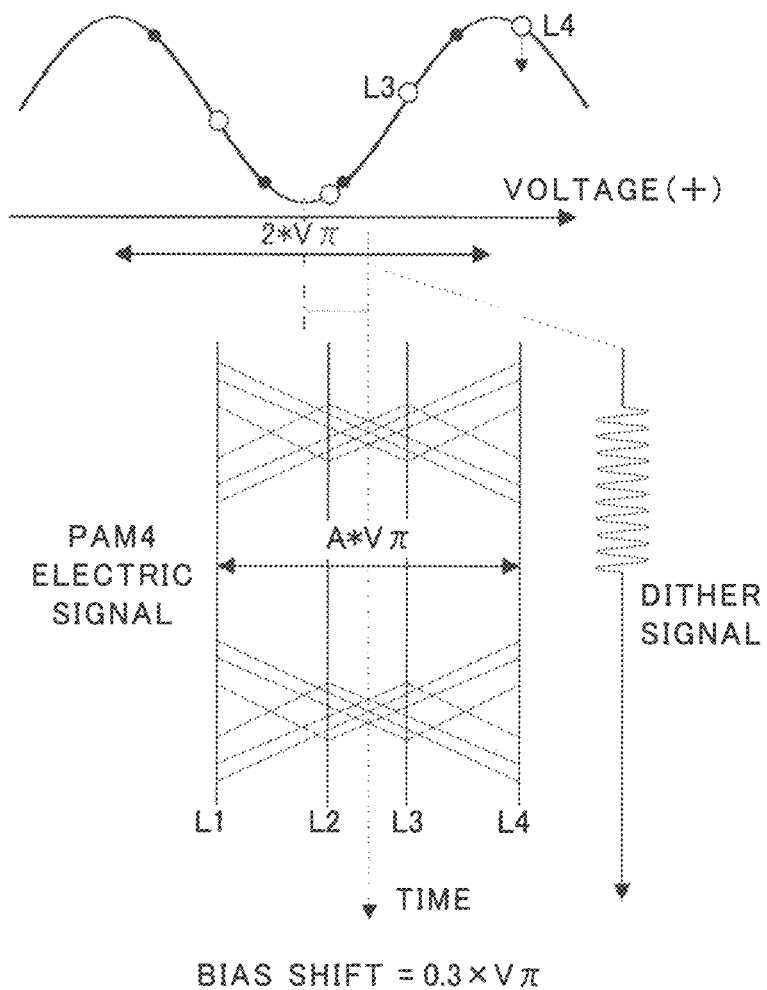
FIG. 5B is a diagram to explain the operation of the optical transmitter according to the first example embodiment of the present invention, and illustrating a driving signal at 16QAM modulation and level positions when a bias shift arises, with the bias shift equal to $0.3 \times V\pi$.
Figure 5C:
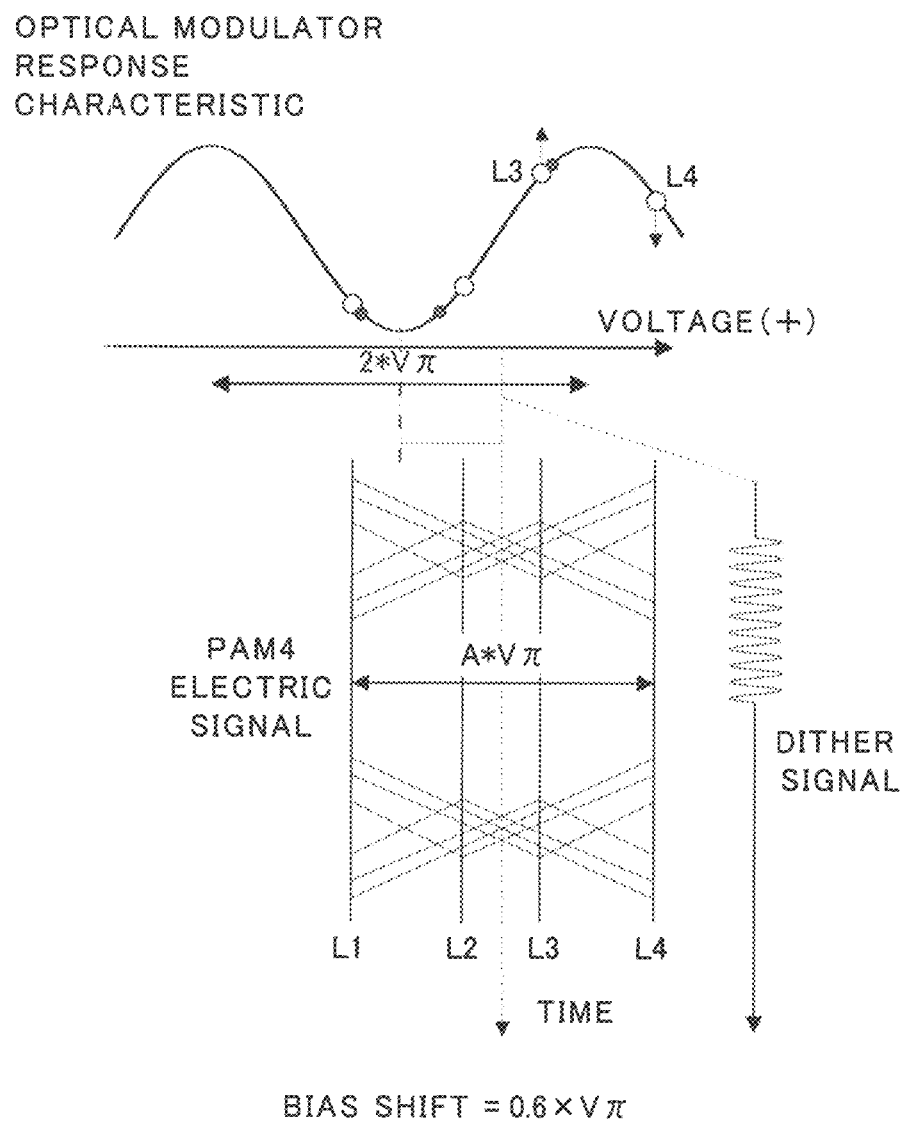
FIG. 5C is a diagram to explain the operation of the optical transmitter according to the first example embodiment of the present invention, and illustrating a driving signal at 16QAM modulation and level positions when a bias shift arises, with the bias shift equal to $0.6 \times V\pi$.

Next, referring to FIG. 5A, FIG. 5B, and FIG. 5C, the behavior of the detected dither signal will be described. FIG. 5A, FIG. 5B, and FIG. 5C respectively illustrate driving signals (PAM4) of the I-arm child MZM at 16QAM modulation and the level (L1, L2, L3, L4) positions with a bias shift occurring. In each figure, black circles on a curve of an optical modulator response characteristic represent normal levels at which bias control is to be performed, and white circles represent with a bias shift occurring.

FIG. 5A illustrates positions of the respective levels with the bias shift equal to 0.1×Vπ, and L4 is positioned at the top point. When the envelope detection is performed in this state, a dither signal related to L4 is extracted. If the dither signal moves to the right in FIG. 5A, that is, in the positive voltage direction of the optical response characteristic, the signal intensity of the L4 level illustrated in FIG. 5A increases.

In contrast, if there is no bias shift, L1, L2, L3, and L4 are positioned at the black-circle points in FIG. 5A. In this case, the signal levels at the top point are both L1 and L4, and signals of L1 and L4 appear in the envelope detection output. If the dither signal moves to the right, L4 increases, and L1 decreases. That is to say, the phases of L4 and L1 have a reverse relationship; consequently, signal variation components are canceled. As a result, no dither signal appears in the envelope detection output.

FIG. 5B illustrates driving signals (PAM4) and positions of the respective levels (L1, L2, L3, L4) with the bias shift equal to 0.3×Vπ. In this case, L4 is positioned at the top point of the respective levels; however, the position of L4 is a position passing the peak point of the optical response characteristic. Accordingly, if the dither signal moves to the right, the signal intensity of the L4 level begins to decrease.

FIG. 5C illustrates driving signals (PAM4) and positions of the respective levels (L1, L2, L3, L4) with the bias shift equal to 0.6×Vπ. In this case, L3 is positioned at the top point of the respective levels. Accordingly, when the envelope detection is performed, the dither signal related to L3 appears. If the dither signal moves to the right, the signal intensity of the L3 point positioned at the top point increases. In contrast, if the dither signal moves to the right, the signal intensity of the L4 level decreases. That is to say, the dither signal of the L3 level moves in reverse phase to the dither signal of the L4 level.

As mentioned above, if a shift occurs in the bias of the optical modulator, the dither signal component of the envelope detection output varies. The signal of the envelope detection output includes the dither signal component; accordingly, if synchronous detection is performed at the frequency signal of the dither signal, the amplitude and phase state of the dither signal can be detected with high sensitivity. In the event of the synchronous detection, the synchronous detection output becomes zero if the bias setting of the optical modulator is proper. If the bias voltage shifts in the positive voltage direction, the synchronous detection output becomes positive because the dither signal of the L4 level becomes dominant. In contrast, if the bias voltage shifts in the negative voltage direction, the L1 level becomes dominant. In this case, L1 and L4 move in reverse phases; consequently, the synchronous detection output becomes negative.

As described above, the bias voltage is controlled so that the synchronous detection output may become zero, which makes it possible to control the bias voltage in the 16QAM optical modulation. However, the point at which the synchronous detection output becomes zero is not confined only to the optimum bias point. For example, the synchronous detection output becomes zero also at inflection points that appear at a state between the state illustrated in FIG. 5B and that illustrated in FIG. 5C. In this case, however, these points become erroneous operation points in the bias voltage control.

In the optical transmitter 100 of the present example embodiment, the bias-voltage control section 160 is configured to control the bias voltage based on the average optical intensity and the top dither signal; therefore, the above-mentioned erroneous operation of the bias voltage control can be prevented.

Here, the top dither-signal detection section 150 can be configured to include an envelope detection section configured to envelope-detect a monitor signal and output an envelope detection signal, and a synchronous detection section configured to synchronously-detect the envelope detection signal by the dither signal and output a top dither signal. The bias-voltage control section 160 can be configured to control the bias voltage so that the average optical intensity becomes minimum and the top dither signal becomes zero.

Next, a method of controlling an optical transmitter according to the present example embodiment will be described.

In the method of controlling an optical transmitter according to the present example embodiment, first, a bias voltage on which a dither signal is superimposed is applied to an optical modulation section constituting the optical transmitter and configured to modulate a laser beam with a driving signal and output an optical signal. Then a monitor signal is generated by detecting a part of the optical signal. An average optical intensity of the optical signal is detected from the monitor signal. A top dither signal is detected from the monitor signal. The top dither signal is superimposed on a waveform with maximum optical intensity included in the optical signal. The bias voltage is controlled based on the average optical intensity and the top dither signal.

With regard to the detection of the top dither signal, the top dither signal may be obtained by envelope-detecting the monitor signal and obtaining an envelope detection signal, and by synchronously-detecting the envelope detection signal by the dither signal. With regard to the control of the bias voltage, the bias voltage can be controlled so that the average optical intensity becomes minimum and the top dither signal becomes zero.

As mentioned above, in the optical transmitter 100 and the method of controlling the optical transmitter according to the present example embodiment, the bias voltage is controlled based on the average optical intensity and the top dither signal. Therefore, according to the optical transmitter 100 and the method of controlling the optical transmitter of the present example embodiment, it becomes possible to perform bias control without depending on a driving signal amplitude even in optical modulations employing an analog signal such as a multilevel modulation signal.

Second Example Embodiment

Next, a second example embodiment of the present invention will be described. FIG. 6 is a block diagram illustrating a configuration of an optical transmitter 226 according to the second example embodiment of the present invention.

The optical transmitter 226 includes a laser 204, an optical modulator 205, and an ABC circuit 224 configured to control a bias voltage of the optical modulator 205. The optical transmitter 226 further includes an encoder 201 configured to supply an electric signal to the optical modulator 205, a driver I 202, and a driver Q 203.

The optical modulator 205 includes an I-arm modulation section 206, a Q-arm modulation section 207, a $\pi/2$ phase shift section 208, and a photodetector 210 configured to monitor and photoelectrically converts a part of an optical modulation signal. A photodiode (PD) can be used as the photodetector 210.

The present example embodiment is configured to perform 16QAM modulation on the optical modulator 205 of an IQ modulator, extract a part of the output light of the optical modulator 205 as a monitor and generate a control signal, and control biases of the I-arm modulation section 206, the Q-arm modulation section 207, and the $\pi/2$ phase shift section 208.

A logical binary data sequence 200 is inputted into the encoder 201 included in the optical transmitter 226. The encoder 201 generates signals for an I-component and a Q-component of the optical modulator 205 in accordance with the modulation system of the optical transmitter 226 and the logical binary data sequence 200. The two kinds of electric signals generated by the encoder 201 are amplified by the driver I 202 and driver Q 203 so that the amplitudes of the electric signals may become optimum for the optical modulator 205. In the present example embodiment, the driving amplitude of PAM4 signals output from the driver I 202 and driver Q 203 is set at $1.6 \times V\pi$ so that 16QAM modulation may be performed in an approximately linear state, and the amplitude of an optical signal 209 becomes as large as possible.

The laser 204 emits a laser beam with a continuous wave. The continuous-wave laser beam is modulated by the optical modulator 205 in accordance with the driving signals generated by the driver I 202 and driver Q 203. The photodetector 210 monitors a part of the optical signal 209 having been modulated, generates an electric signal proportional to the intensity of the optical signal, and supplies the electric signal to the ABC circuit 224.

The ABC circuit 224 includes a bias control section 225. The bias control section 225 controls not only DC biases of the I-arm modulation section 206 and Q-arm modulation section 207 but also a bias of the $\pi/2$ phase shift section 208 that adjusts a quadrature phase angle between I and Q. A time-division control section 219 included in the bias control section 225 uses, as a dither signal, a sine wave signal from a low frequency oscillator 217. The time-division control section 219 time-divides the sine wave signal and superimposes time-divided signals on the bias signal 220 of the I-arm modulation section 206, the bias signal 222 of the Q-arm modulation section 207, and the bias signal 223 of the π/2 phase shift section 208. In the present example embodiment, the amplitude of the dither signal to be applied to the optical modulator 205 is set at 0.02 times as large as the half-wavelength voltage, and the frequency of the low frequency oscillator 217 is set at 1 kHz. As the dither signal, for example, the sine wave of the low frequency oscillator 217 can be cut out in time division every ten cycles, and can be multiplexed on each DC bias in time division. The ABC circuit 224 can be configured using a digital signal processor (DSP)

The ABC circuit 224 amplifies the electric signal obtained from the photodetector 210 by an amplifier 211, and then generates a signal for control. A signal from the amplifier 211 is divided into two signals, one of which is inputted into an envelope detector 212, and then a dither signal component is extracted by a band-pass filter (BPF) 214. The pass frequency of the band-pass filter 214 is set at a frequency equal to that of the low frequency oscillator 217. A synchronous detector 216 synchronously-detects the output signal from the band-pass filter 214 with the sine wave signal from the low frequency oscillator 217. This makes it possible to obtain a first control signal 231 by which the DC biases of the I-arm modulation section 206, Q-arm modulation section 207, and π/2 phase shift section 208 are controlled.

The other signal of the two signals obtained by dividing the signal from the amplifier 211 is inputted into an average optical intensity detector 213 that can detect optical signal power. A second control signal 232 is obtained by canceling noise from the signal output from the average optical intensity detector 213 by a low-pass filter 215.

A DC bias controller 218 included in the bias control section 225 generates a DC component of each bias signal from the first control signal 231 and second control signal 232. That is to say, the DC bias controller 218 generates a DC component of the bias signal 220 of the I-arm modulation section 206, a DC component of the bias signal 222 of the Q-arm modulation section 207, and a DC component of the bias signal 223 of the π/2 phase shift section 208.

Figure 7:
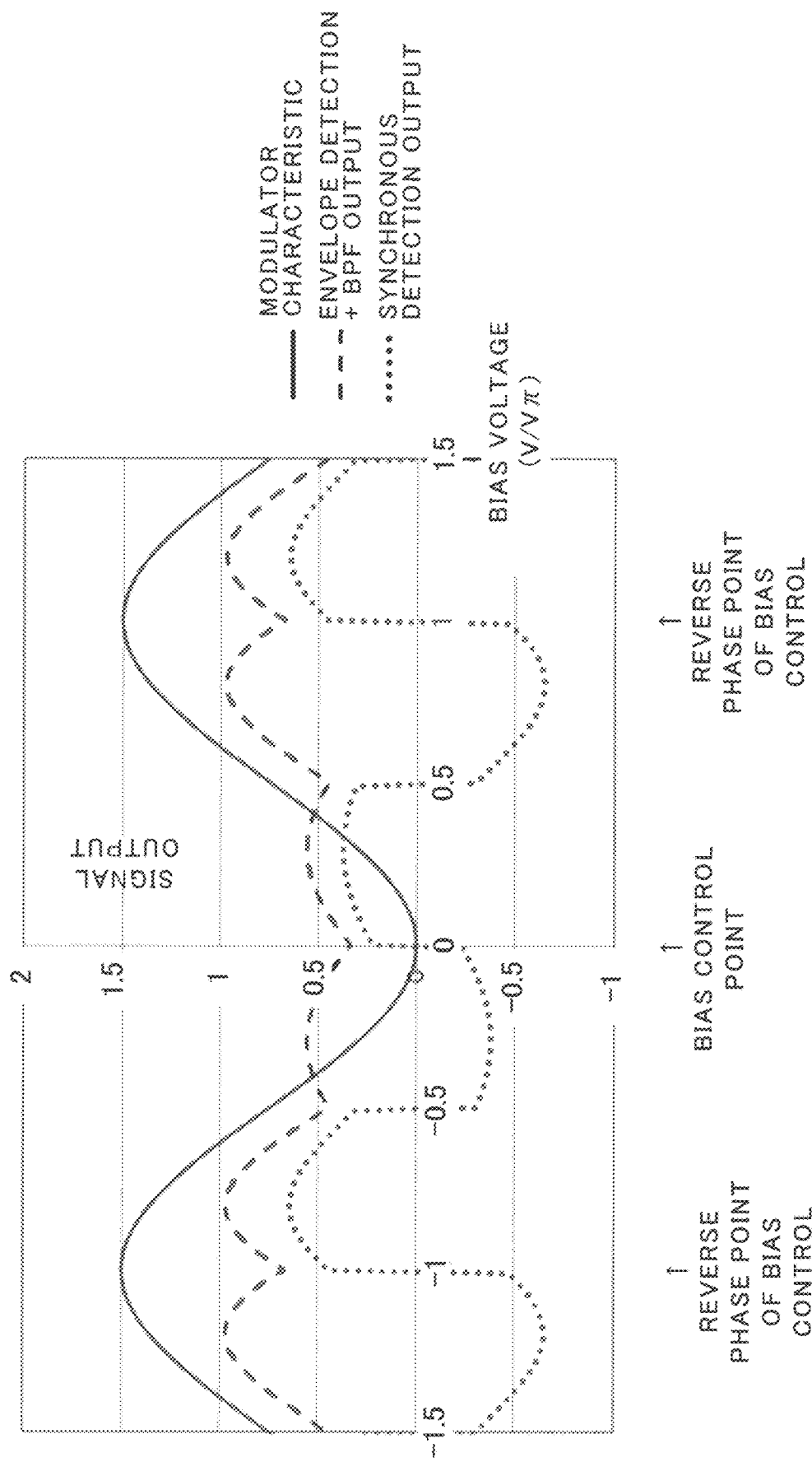
FIG. 7 is a diagram illustrating calculation results of envelope detection output and synchronous detection output of a dither signal to explain the operation of the optical transmitter according to the second example embodiment of the present invention.

FIG. 7 illustrates calculation results of signal output from the envelope detector 212 that is obtained through the band-pass filter 214, and signal output from the synchronous detector 216. Here, the horizontal axis of the graph in FIG. 7 represents a voltage (V) of a bias shift that is expressed by a ratio (V/Vπ) to the half-wavelength voltage (Vπ) of the optical modulator. In FIG. 7, a point at V/Vπ equal to zero becomes a bias control point of the optical modulator.

The signal output from the envelope detector 212 (a broken line in the figure) has a waveform with a valley at V/Vπ=0, a valley at around V/Vπ=0.5, and a valley at V/Vπ=1.0. The tendency of this curve is consistent with the description referring to FIG. 5A to FIG. 5C. That is to say, if V/Vπ varies from zero to +0.1 with a bias shift occurring, a balanced state of the intensities of level L1 and level L4 is disrupted, L4 increases, and a dither component related to L4 increases. Here, as illustrated in FIG. 5A, the dither component related to L4 has a reverse phase relationship to the dither component related to L1.

If the bias shift is in the range of approximately 0<V/Vπ<0.5, the dither component related to L4 is output in the output that has been envelope-detected and has passed through the band-pass filter. The intensity levels of L4 and L3 are balanced with the bias shift around V/Vπ=0.5. If the bias shift is located around V/Vπ>0.5, the dither component related to L3 is output from the envelope detector to the band-pass filter. Here, the dither components of the L3 level and the L4 level have a reverse phase relationship. If the bias shift becomes V/Vπ=1, the L3 level and the L2 level are balanced and a valley appears, and a dither component of the L2 level, which is a reverse phase relationship to L3, appears in the range of V/Vπ>1.

FIG. 7 also illustrates the results of synchronous detection of the signal output from the envelope detector 212 and the band-pass filter 214 (a dotted line in the figure). Because a sine wave signal from the low frequency oscillator 217, which can be a dither signal, is also inputted into the synchronous detector 216, the output of the synchronous detector 216 is a signal reflecting the intensity and phase state of the detected dither signal. FIG. 7 illustrates a case where the synchronous detection output becomes positive (+) output in the range of approximately 0<V/Vπ<0.5 by adjusting the phase of the sine wave signal from the low frequency oscillator 217 to be inputted into the synchronous detector 216.

The output of the synchronous detector 216 illustrated in FIG. 7 becomes zero at the bias control point (V/Vπ=0). Near the bias control point, the synchronous detection output becomes negative (−) in the range of V/Vπ<0, and the synchronous detection output becomes positive (+) in the range of V/Vπ>0. That is to say, the synchronous detection output becomes a high-sensitive error signal that becomes zero at the control target point and that has a positive slope with respect to V/Vπ. By using the characteristics of the synchronous detection output, the bias voltage of the optical modulator can be accurately controlled so as to be positioned at the point of V/Vπ=0.

However, in the above-described control method, the zero output point at which the error signal has a positive slope with respect to V/Vπa is judged as a stable point; accordingly, there is a possibility of converging at a bias point of V/Vπ=−1 or V/Vπ=+1 as a stable point of the control. Such a bias point is a maximum transmission point in the optical modulation characteristics, and an erroneous stable point of the control that is located in reverse phase to the target bias-control point. However, the optical transmitter 226 according to the present example embodiment is configured to use the second control signal 232 through the average optical intensity detector 213 and the low-pass filter 215; therefore, the above-described erroneous operation can be prevented. The second control signal 232 is a signal to monitor the average optical intensity of the optical signal 209, and has the characteristic that optical transmission output at 16QAM optical modulation becomes minimum if the bias control is set in a normal way.

Figure 8A:
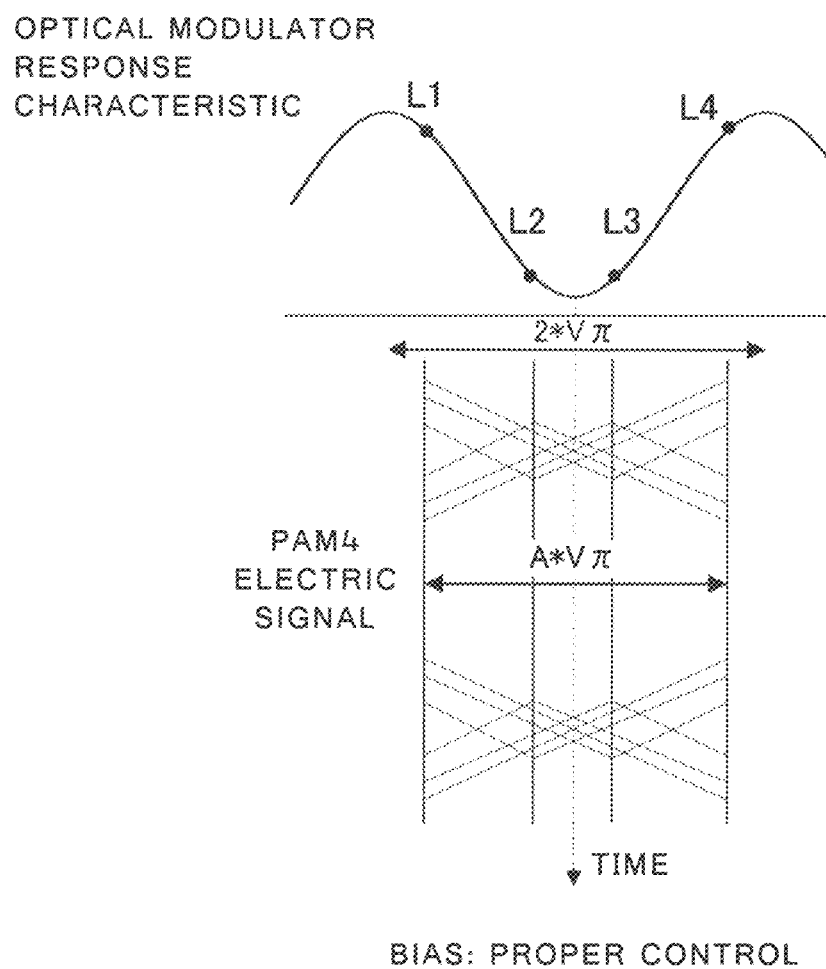
FIG. 8A is a diagram illustrating optical output in a proper bias condition to explain the operation of the optical transmitter according to the second example embodiment of the present invention.

Next, referring to FIG. 8A and FIG. 8B, optical transmission output at 16QAM optical modulation will be described. FIG. 8A illustrates a state in which the bias voltage is properly controlled, and FIG. 8B illustrates a state in which a bias shift has become equal to Vπ.

Here, the modulation is set in the setting condition that the optical transmission output is large, and that each symbol has good linearity, that is, the driving amplitude is set at 1.6×Vπ. With the setting of the amplitude value, the dither signal cannot be extracted by the conventional method described in Patent Literature 1. Black circles on the curve illustrated in FIG. 8A represent optimum level setting for 16QAM modulation. Here, the optimum level setting means respective driving amplitude levels (L1, L2, L3, L4) that are set taking into account the intensity response characteristic of the optical modulator. That is to say, the driving amplitude values are set so that the relationship between the respective driving amplitude levels may satisfy L2=L3=⅓×L1=⅓×L4 in terms of the absolute values of photoelectric field intensity.

Figure 8B:
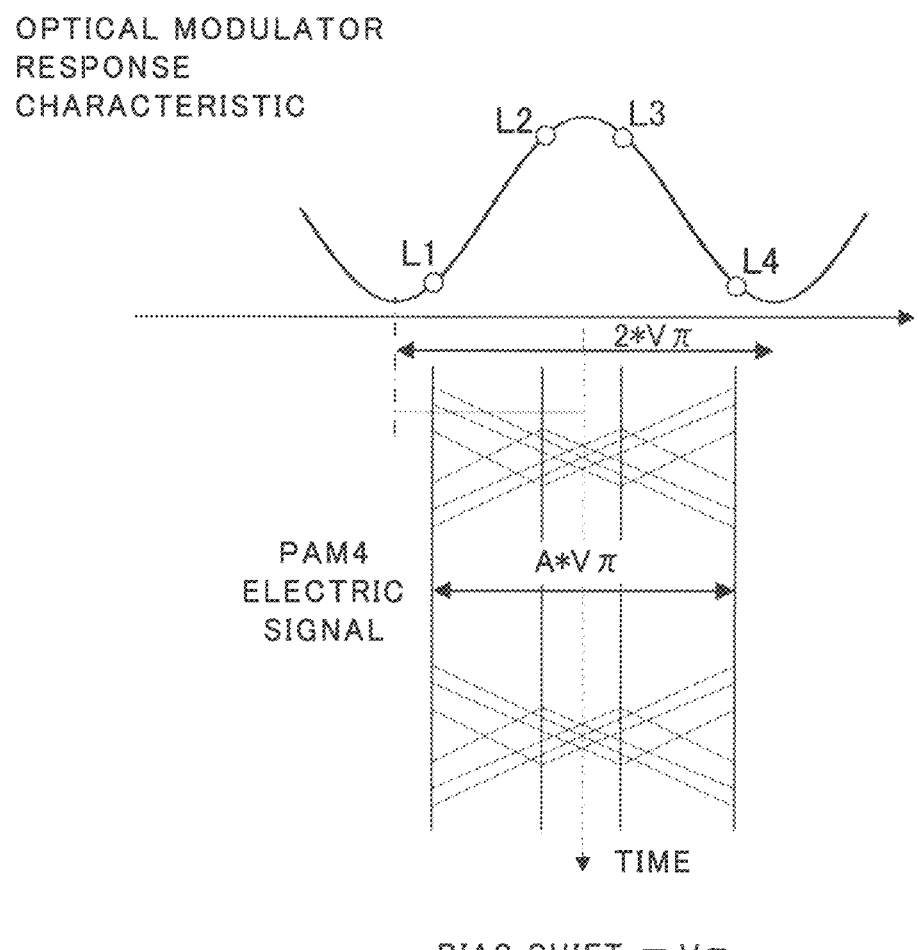
FIG. 8B is a diagram to explain the operation of the optical transmitter according to the second example embodiment of the present invention, and illustrating optical output when a bias shift arises.

FIG. 8B illustrates a drive status in a case where a bias shift of Vπ arises. This status is the above-described state in which the bias point is located at an erroneous stable point of the control, which can arise in the control with a synchronously detected error signal.

If the optical output in the drive condition with the proper bias illustrated in FIG. 8A is compared to the optical output in the drive condition with the bias shift of Vπ illustrated in FIG. 8B, the optical output of PAM 4 having been output becomes larger in the case illustrated in FIG. 8B. This is because passing through the maximum value of the optical modulator response characteristic arises in the transition between the levels of L2 and L3 in the drive condition with the bias shift of Vπ illustrated in FIG. 8B. In contract, in the drive condition with the proper bias illustrated in FIG. 8A, passing through the minimum value of the optical modulator response characteristic arises in the transition between the levels of L2 and L3. Consequently, the optical output at PAM4 modulation becomes minimum.

Figure 9:
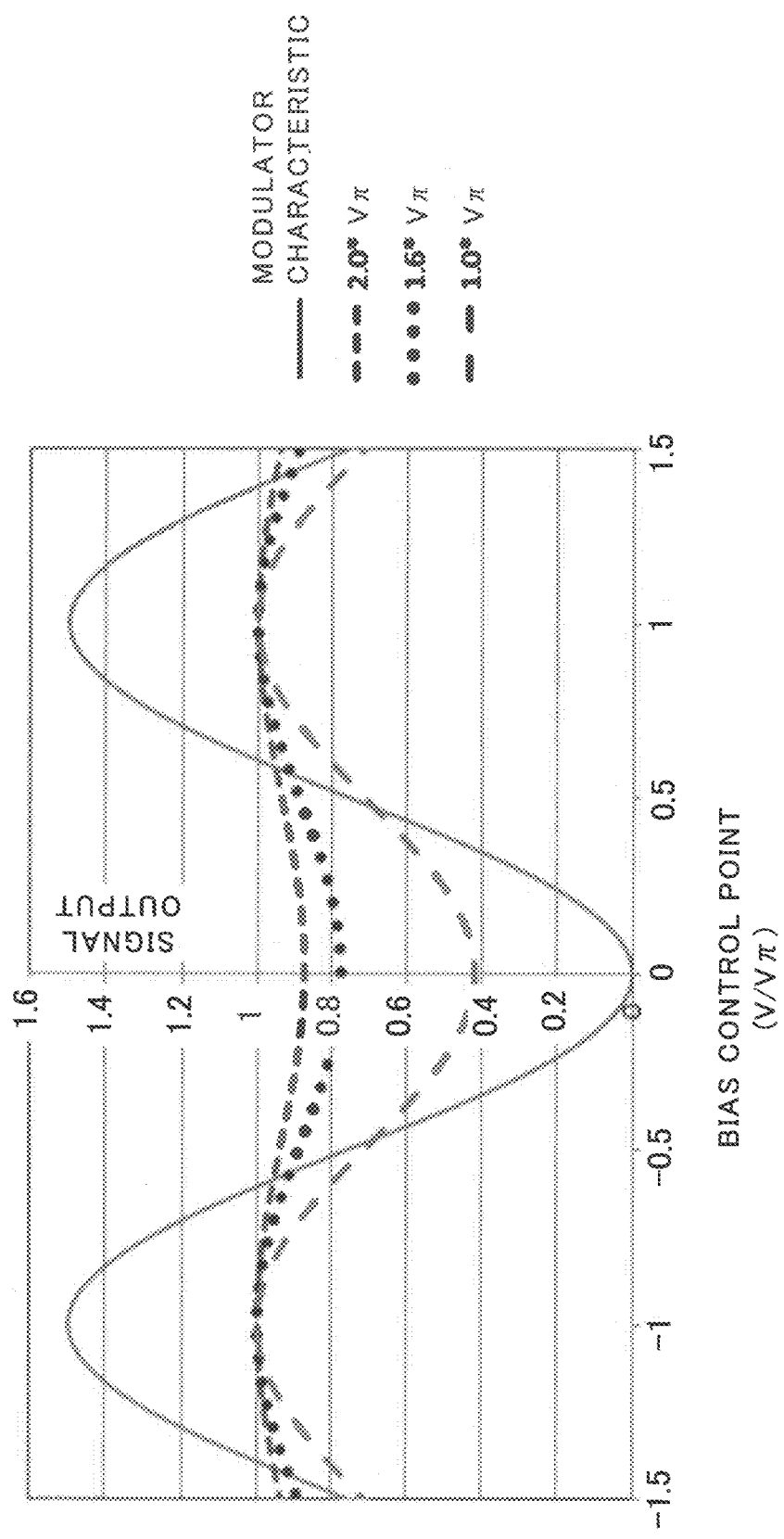
FIG. 9 is a diagram to explain the operation of the optical transmitter according to the second example embodiment of the present invention, and illustrating calculation results of the bias voltage dependency of optical signal output.

FIG. 9 illustrates calculation results of the optical output at 16QAM modulation including the transition between L2 and L3. The calculation is performed in the condition that the bias voltage is varied in the optical modulation for the I-arm, and that the bias is fixed to the optimum bias in the optical modulation for the Q-arm.

As illustrated in FIG. 9, if the driving amplitude is equal to 1.6×Vπ, the optical output becomes minimum at V/Vπ, =0, and becomes maximum at V/Vπ, =1. Dither signal components are not included in the signal. As illustrated in FIG. 9, the optical output depends on the variation in the bias voltage, and the variation is equal to approximately 0.77 in terms of the ratio between the minimum value and maximum value. This makes it possible to search a minimum region around 0 V of a proper bias.

As mentioned above, in the optical transmitter 226 of the present example embodiment, the bias control is performed so that the optical output may become minimum, which makes the bias voltage set at around V/Vπ, =0, and then high-precision control is performed using the error signal obtained by synchronously-detecting the signal output of the envelope detector. This makes it possible to perform the bias control without depending on the driving signal amplitude; accordingly, it becomes possible to control the bias for 16QAM in the drive condition of a large amplitude by which large optical output can be obtained.

Figure 10:
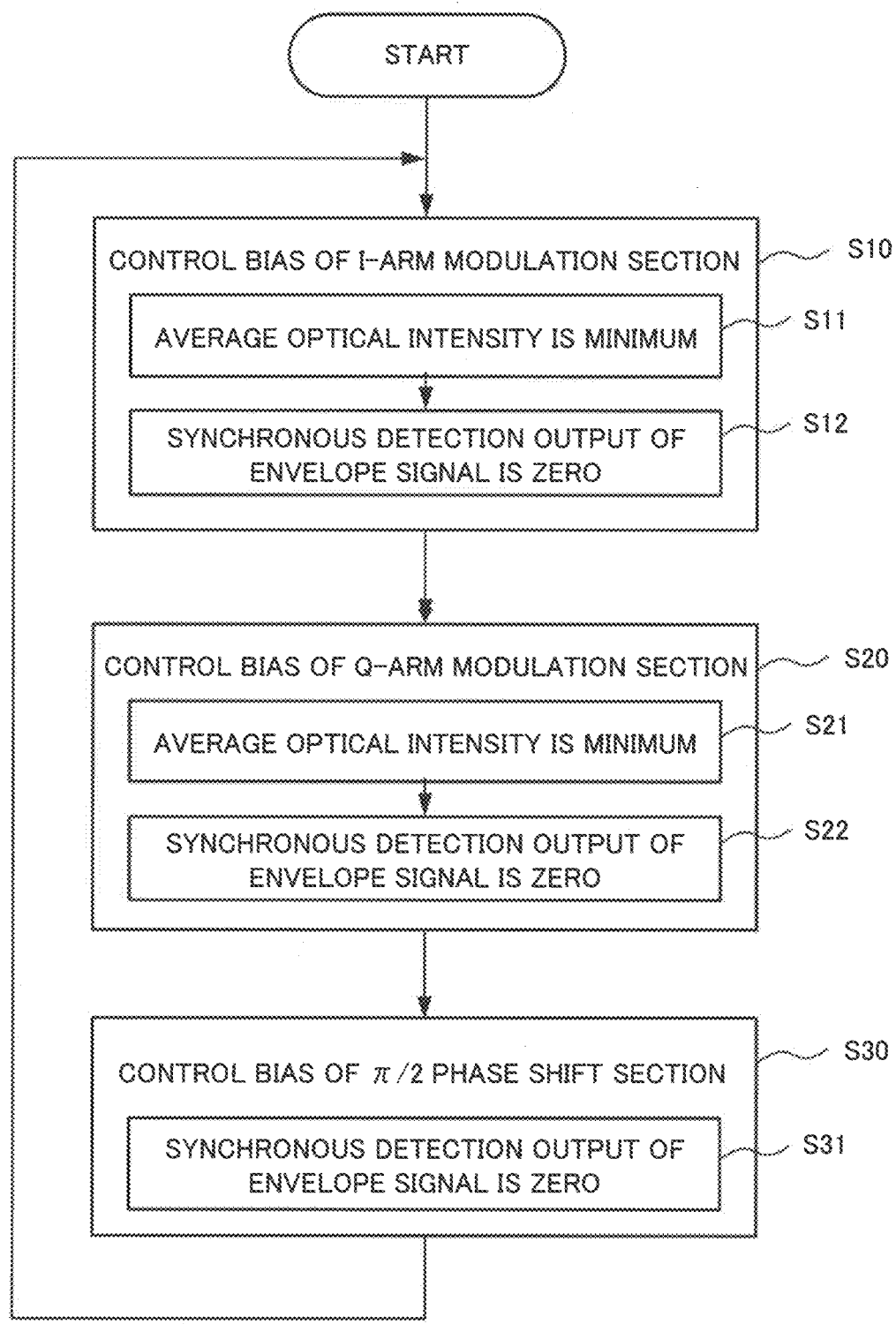
FIG. 10 is a flowchart to explain a bias control method of an optical modulator according to the second example embodiment of the present invention.

Next, a bias control method of the optical modulator using the above-mentioned two kinds of control signals will be described. FIG. 10 is a flowchart to explain the bias control method of the optical modulator using the two kinds of control signals. In the above-mentioned 16QAM optical modulation with a large driving amplitude, the bias control is performed with time division. That is to say, as illustrated in FIG. 10, the following steps are performed in turn: bias control of the I-arm modulation section (step S10), bias control of the Q-arm modulation section (step S20), and bias control of the π/2 phase shift section (step S30).

In the bias control of the I-arm modulation section (step S10), first, the bias control of the I-arm modulation section is performed so that the average optical intensity becomes minimum (step S11). Then the bias control of the I-arm modulation section is performed with high precision so that the synchronous detection output of the output signal from the envelope detector becomes zero (step S12). Similarly, in the bias control of the Q-arm modulation section (step S20), first, the bias control of the Q-arm modulation section is performed so that the average optical intensity becomes minimum (step S21). Then the bias control of the Q-arm modulation section is performed with high precision so that the synchronous detection output of the output signal from the envelope detector becomes zero (step S22).

In the bias control of the π/2 phase shift section (step S30), the bias control of the π/2 phase shift section is performed so that the synchronous detection output of the output signal from the envelope detector becomes zero (step S31). As described above, also in the control of the π/2 phase shift section, the envelope detector is used for detection of an I/Q quadrature shift, and the synchronous detector is also used, which enable the high precision control to be performed.

The above-mentioned control method of the optical modulator is performed repeatedly, which enables high-precision bias control of the optical modulator to be performed.

As mentioned above, according to the optical transmitter 226 and the method of controlling it of the present example embodiment, the bias of the optical modulator can be controlled even in the drive condition with a large driving amplitude by which the bias control cannot be performed according to the conventional method. Specifically, in the 16QAM optical modulation according to the conventional method, the driving amplitude by which the bias control can be performed is approximately 1.0×Vπ; however, according to the optical transmitter 226 and the method of controlling it of the present example embodiment, it becomes possible to perform the bias control even with the driving amplitude of 1.6×Vπ. As a result, the optical transmission output can be increased by approximately 2.8 dB.

In the present example embodiment, the case has been described in which the drive waveform amplitude of the optical modulator is equal to 1.6×Vπ; however, the example embodiment is not limited to this. It is possible to perform the bias control even though the drive waveform amplitude is set at 2×Vπ of the maximum amplitude.

Third Example Embodiment

Next, a third example embodiment of the present invention will be described.

In the present example embodiment, a case will be described in which a QPSK Nyquist waveform signal is used as the driving signal of the optical modulator. The configuration of an optical transmitter is similar to that of the optical transmitter 226 according to the second example embodiment. In the following description, the baud-rate of the QPSK Nyquist signal is set at 32 GHz, and a roll-off coefficient α of a Nyquist filter to be used is set at 0.1.

Figure 11:
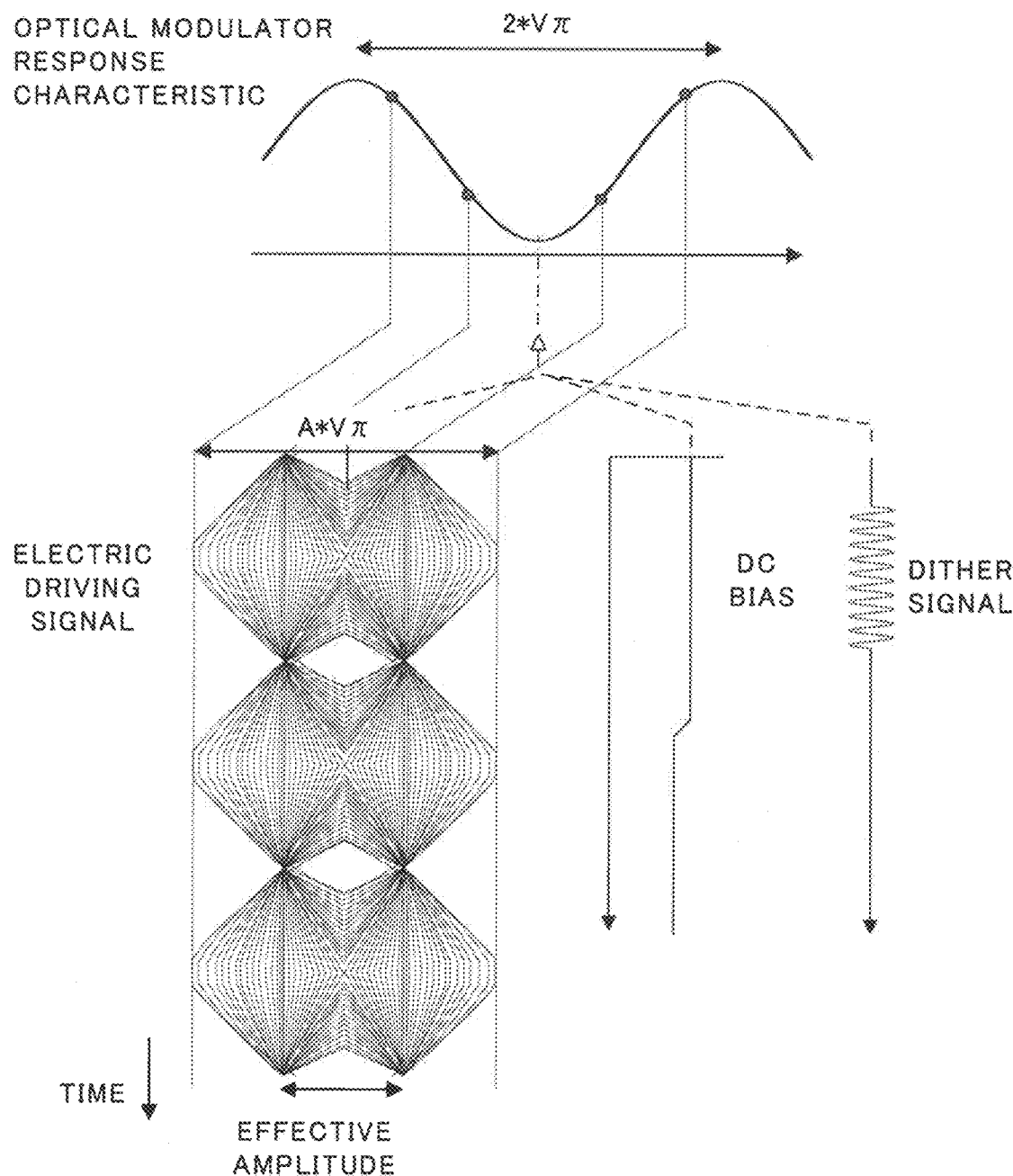
FIG. 11 is a diagram to explain the operation of an optical transmitter according to a third example embodiment of the present invention, and illustrating an optical response characteristic of an optical modulator and driving signals of QPSK Nyquist modulation.

FIG. 11 illustrates the optical response characteristic of the optical modulator and the driving signals for QPSK Nyquist modulation. As illustrated in the figure, a large peak appears in a transition part between symbols in the Nyquist waveform signals. In the present example embodiment, the maximum amplitude of this peak value is set at 1.7×Vπ. Because the roll-off coefficient α is set at 0.1, the effective amplitude between the symbols becomes 0.7×Vπ. In the drive condition of QPSK Nyquist modulation, it is impossible to extract a dither signal with a sufficient amplitude according to the conventional bias control method described in the background art. Consequently, it is impossible to perform a stable bias control according to the conventional method.

Figure 12:
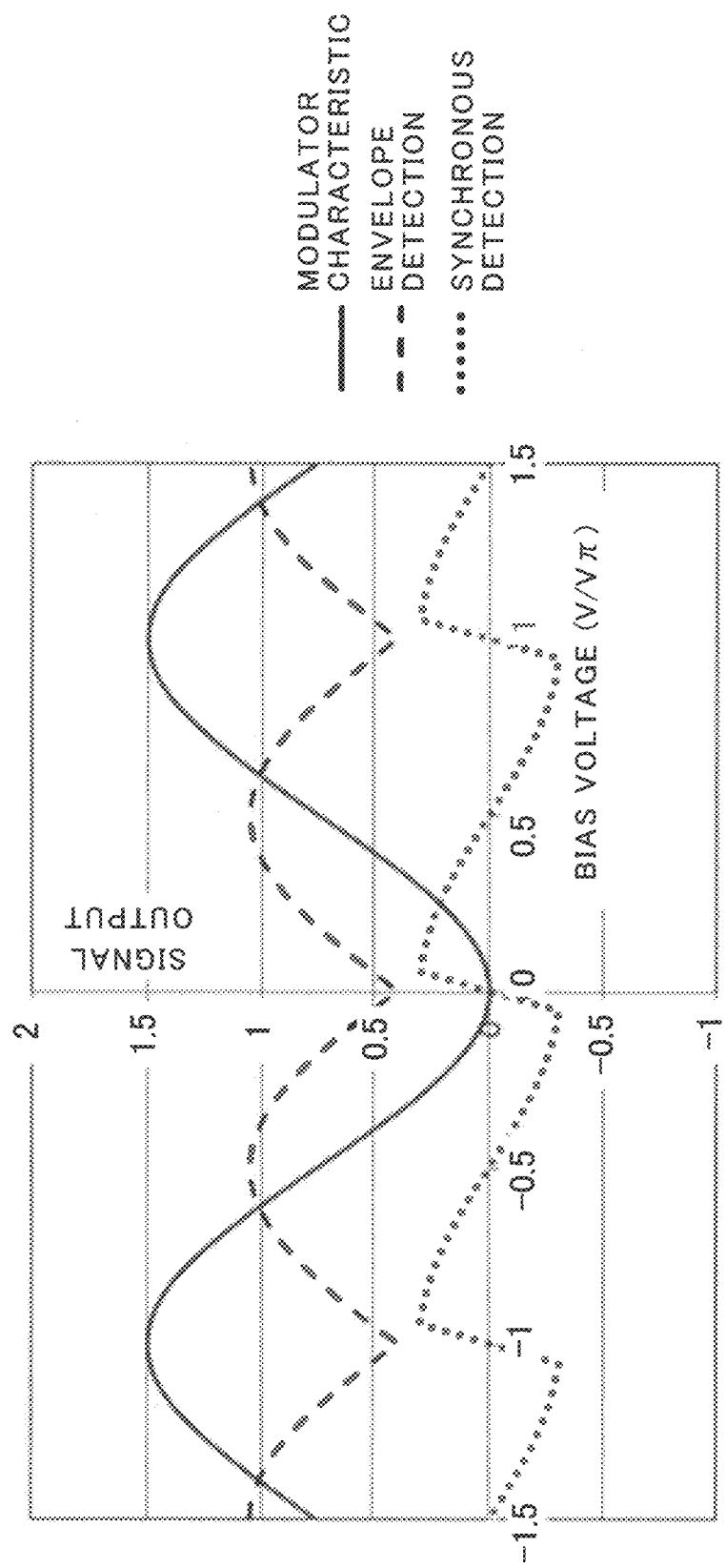
FIG. 12 is a diagram to explain the operation of the optical transmitter according to the third example embodiment of the present invention, and illustrating envelope detection output and synchronous detection output of a dither signal.

FIG. 12 illustrates signal output from the envelope detector 212 through the band-pass filter 214 and signal output from the synchronous detector 216. Here, the horizontal axis of the graph in the figure represents a voltage (V) of a bias shift that is expressed by a ratio (V/Vπ) to the half-wavelength voltage (Vπ) of the optical modulator.

The signal output from the envelope detector 212 (a broken line in the figure) has a curve with valleys at V/Vπ=0, V/Vπ=1, and V/Vπ=−1, and maximum values at V/Vπ=−0.5, and V/Vπ=0.5.

FIG. 12 also illustrates a result obtained by synchronously detecting the signal output from the envelope detector 212 through the band-pass filter 214 (a dotted line in the figure). FIG. 12 illustrates a case where the synchronous detection output becomes positive (+) output in the range of 0<V/Vπ<0.5 by adjusting the phase of the sine wave signal from the low frequency oscillator 217 to be inputted into the synchronous detector 216.

As illustrated in FIG. 12, the signal output of the synchronous detector 216 becomes zero at the bias control point (V/Vπ=0). Near the bias control point, the synchronous detection output becomes negative (−) in the range of V/Vπ<0, and the synchronous detection output becomes positive (+) in the range of V/Vπ>0. That is to say, the synchronous detection output becomes a high-sensitive error signal that becomes zero at the control target point and that has a positive slope with respect to V/Vπ. By using the characteristics of the synchronous detection output, the bias voltage of the optical modulator can be accurately controlled so as to be positioned at the point of V/Vπ=0.

On the other hand, in the synchronous detection output, zero points with a positive slope also appear at points of V/Vπ=−1 and V/Vπ=+1. The two points of V/Vπ=−1 and V/Vπ=+1 are erroneous stable points in the bias control. According to the optical transmitter and the method of controlling it of the present example embodiment, however, such erroneous stable points can be excluded from the targets of control, as described below.

Figure 13:
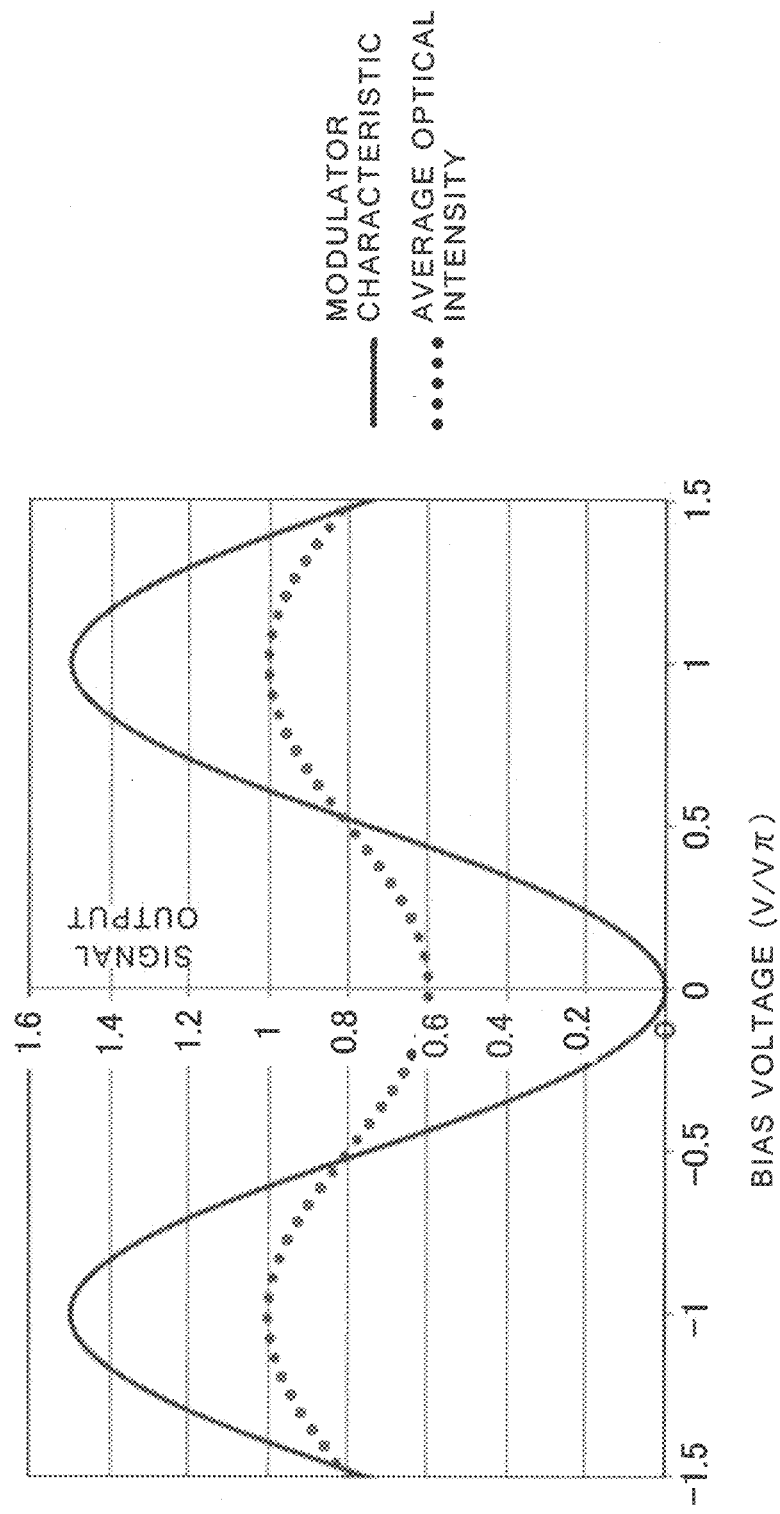
FIG. 13 is a diagram to explain the operation of the optical transmitter according to the third example embodiment of the present invention, and illustrating calculation results of optical output in QPSK Nyquist optical modulation.

FIG. 13 illustrates calculation results of optical output at QPSK Nyquist optical modulation. The calculation is performed in the condition that the bias voltage is varied in the optical modulation for the I-arm, and that the bias is fixed to the optimum bias in the optical modulation for the Q-arm. As illustrated in FIG. 13, the optical output becomes minimum when the shift of bias voltage becomes zero (V/Vπ=0), and the optical output becomes maximum at V/Vπ, =1. Dither signal components are not included in this signal, either. As illustrated in FIG. 13, the average optical output depends on the variation in the bias voltage, and the variation is equal to approximately 0.6 in terms of the ratio between the minimum value and maximum value. This makes it possible to search a minimum region around 0 V of a proper bias.

The bias control of the optical modulator can be performed by using the signal output by the synchronous detection described with reference to FIG. 12 and the signal output of the average optical intensity described with reference to FIG. 13. In this case, it is also possible to perform the control according to a similar procedure to that described in the flowchart illustrated in FIG. 10. That is to say, first, the bias control of the child MZM is performed so that the average optical intensity becomes minimum. Next, the bias control is performed so that the synchronous detection output from the envelope detector becomes zero near V/Vπ=0. This makes it possible to perform the bias control even though optical modulation is performed using the QPSK Nyquist waveform signal.

As mentioned above, according to the optical transmitter and the method of controlling it of the present example embodiment, it becomes possible to perform the bias control without depending on a driving signal amplitude even in optical modulations employing an analog signal in accordance with the Nyquist modulation system.

In the above-described example embodiments, the optical modulation has been described that is performed in accordance with the 16QAM system and the QPSK Nyquist system. However, the modulation system is not limited to those, and the present invention can be applied even though the optical modulation is performed in accordance with various QAM systems such as 16QAM Nyquist modulation system, 64QAM system, and 64QAM Nyquist modulation system.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100, 226 Optical transmitter
101 Laser beam
102 Optical signal
110 Optical modulation section
120 Monitor section
130 Bias-voltage applying section
140 Average optical intensity detection section
150 Top dither-signal detection section
160 Bias-voltage control section
201 Encoder
202 Driver I
203 Driver Q
204 Laser
205 Optical modulator
206 I-arm modulation section
207 Q-arm modulation section
208 π/2 phase shift section
209 Optical signal
210 Photodetector
211 Amplifier
212 Envelope detector
213 Average optical intensity detector
214 Band-pass filter
215 Low-pass filter
216 Synchronous detector
217 Low frequency oscillator
218 DC bias controller
219 Time-division control section
220, 222, 223 Bias signal
224 ABC circuit
225 Bias control section
231 First control signal
232 Second control signal
8 QPSK modulator
9A Monitor section
11 Related optical transmitter
87 Photodiode (PD)
91 Average optical intensity monitor
92 Optical intensity AC component monitor
93A Bias control section
94 I/V conversion section
95 f0 generation section
96A, 96B Band-pass filter (BPF)
97 Synchronous detection section

The invention claimed is:

1. An optical transmitter, comprising:
   an optical modulation section configured to modulate a laser beam with a driving signal and output an optical signal;
   a monitor section configured to detect a part of the optical signal and output a monitor signal;
   a bias voltage applying section configured to apply, to the optical modulation section, a bias voltage on which a dither signal is superimposed;
   an average optical intensity detection section configured to detect an average optical intensity of the optical signal from the monitor signal;
   a top dither signal detection section configured to detect, from the monitor signal, a top dither signal that is superimposed on a waveform with maximum optical intensity included in the optical signal; and
   a bias voltage control section configured to control the bias voltage based on the average optical intensity and the top dither signal.

2. The optical transmitter according to claim 1,
   wherein the top dither signal detection section includes an envelope detection section configured to envelope-detect the monitor signal and output an envelope detection signal, and a synchronous detection section configured to synchronously-detect the envelope detection signal by the dither signal and output the top dither signal.

3. The optical transmitter according to claim 1,
   wherein the bias voltage control section is configured to control the bias voltage so that the average optical intensity becomes minimum and the top dither signal becomes zero.

4. The optical transmitter according to claim 1,
   wherein the optical modulation section includes
   a first optical modulator configured to modulate a first laser beam that is one of two laser beams obtained by dividing the laser beam with a first driving signal, and output a first optical signal,
   a second optical modulator configured to modulate a second laser beam that is the other of the two laser beams obtained by dividing the laser beam with a second driving signal, and output a second optical signal, and
   a phase control section configured to control a phase difference between the first optical signal and the second optical signal,
   wherein the bias voltage applying section is configured to apply, by time division, a first bias voltage on which the dither signal is superimposed to the first optical modulator, a second bias voltage on which the dither signal is superimposed to the second optical modulator, and a third bias voltage on which the dither signal is superimposed to the phase control section.

5. The optical transmitter according to claim 1,
   wherein the driving signal is an analog waveform signal.

6. The optical transmitter according to claim 5,
   wherein the driving signal is one of an analog waveform signal by a multilevel modulation system including a quadrature amplitude modulation system and an analog waveform signal by a Nyquist modulation system.

7. A method of controlling an optical transmitter, comprising:
   applying a bias voltage on which a dither signal is superimposed to an optical modulation section constituting the optical transmitter and configured to modulate a laser beam with a driving signal and output an optical signal;
   detecting a part of the optical signal and generating a monitor signal;
   detecting an average optical intensity of the optical signal from the monitor signal;
   detecting a top dither signal from the monitor signal, the top dither signal being superimposed on a waveform with maximum optical intensity included in the optical signal; and
   controlling the bias voltage based on the average optical intensity and the top dither signal.

8. The method of controlling the optical transmitter according to claim 7,
   wherein the detecting of the top dither signal includes obtaining the top dither signal by envelope-detecting the monitor signal and obtaining an envelope detection signal, and by synchronously-detecting the envelope detection signal by the dither signal.

9. The method of controlling the optical transmitter according to claim 7,
   wherein the controlling of the bias voltage includes controlling the bias voltage so that the average optical intensity becomes minimum and the top dither signal becomes zero.

10. The method of controlling the optical transmitter according to claim 7,
    wherein the applying of the bias voltage includes
    applying a first bias voltage on which the dither signal is superimposed to a first optical modulator included in the optical modulation section,
    applying a second bias voltage on which the dither signal is superimposed to a second optical modulator included in the optical modulation section,
    applying a third bias voltage on which the dither signal is superimposed to a phase control section included in the optical modulation section, and
    applying the first bias voltage, the second bias voltage, and the third bias voltage, by time division.

11. The optical transmitter according to claim 2,
    wherein the bias voltage control section is configured to control the bias voltage so that the average optical intensity becomes minimum and the top dither signal becomes zero.

12. The optical transmitter according to claim 2,
    wherein the optical modulation section includes
    a first optical modulator configured to modulate a first laser beam that is one of two laser beams obtained by dividing the laser beam with a first driving signal, and output a first optical signal,
    a second optical modulator configured to modulate a second laser beam that is the other of the two laser beams obtained by dividing the laser beam with a second driving signal, and output a second optical signal, and
    a phase control section configured to control a phase difference between the first optical signal and the second optical signal,
    wherein the bias voltage applying section is configured to apply, by time division, a first bias voltage on which the dither signal is superimposed to the first optical modulator, a second bias voltage on which the dither signal is superimposed to the second optical modulator, and a third bias voltage on which the dither signal is superimposed to the phase control section.

13. The optical transmitter according to claim 3, wherein the optical modulation section includes a first optical modulator configured to modulate a first laser beam that is one of two laser beams obtained by dividing the laser beam with a first driving signal, and output a first optical signal, a second optical modulator configured to modulate a second laser beam that is the other of the two laser beams obtained by dividing the laser beam with a second driving signal, and output a second optical signal, and a phase control section configured to control a phase difference between the first optical signal and the second optical signal, wherein the bias voltage applying section is configured to apply, by time division, a first bias voltage on which the dither signal is superimposed to the first optical modulator, a second bias voltage on which the dither signal is superimposed to the second optical modulator, and a third bias voltage on which the dither signal is superimposed to the phase control section.

14. The optical transmitter according to claim 2, wherein the driving signal is an analog waveform signal.

15. The optical transmitter according to claim 3, wherein the driving signal is an analog waveform signal.

16. The optical transmitter according to claim 4, wherein the driving signal is an analog waveform signal.

17. The optical transmitter according to claim 14, wherein the driving signal is one of an analog waveform signal by a multilevel modulation system including a quadrature amplitude modulation system and an analog waveform signal by a Nyquist modulation system.

18. The method of controlling the optical transmitter according to claim 8, wherein the controlling of the bias voltage includes controlling the bias voltage so that the average optical intensity becomes minimum and the top dither signal becomes zero.

19. The method of controlling the optical transmitter according to claim 8, wherein the applying of the bias voltage includes applying a first bias voltage on which the dither signal is superimposed to a first optical modulator included in the optical modulation section, applying a second bias voltage on which the dither signal is superimposed to a second optical modulator included in the optical modulation section, applying a third bias voltage on which the dither signal is superimposed to a phase control section included in the optical modulation section, and applying the first bias voltage, the second bias voltage, and the third bias voltage, by time division.

20. The method of controlling the optical transmitter according to claim 9, wherein the applying of the bias voltage includes applying a first bias voltage on which the dither signal is superimposed to a first optical modulator included in the optical modulation section, applying a second bias voltage on which the dither signal is superimposed to a second optical modulator included in the optical modulation section, applying a third bias voltage on which the dither signal is superimposed to a phase control section included in the optical modulation section, and applying the first bias voltage, the second bias voltage, and the third bias voltage, by time division.

* * * * *